United States Patent
Kuo et al.

(10) Patent No.: US 7,367,308 B2
(45) Date of Patent: May 6, 2008

(54) METHOD FOR LOAD TRANSIENT CONTROL BETWEEN LEAN AND STOICHIOMETRIC COMBUSTION MODES OF DIRECT-INJECTION ENGINES WITH CONTROLLED AUTO-IGNITION COMBUSTION

(75) Inventors: Tang-Wei Kuo, Troy, MI (US); Jun-Mo Kang, Ann Arbor, MI (US); Chen-Fang Chang, Troy, MI (US); Zongxuan Sun, Troy, MI (US); James A. Eng, Troy, MI (US); Barry L. Brown, Lake Orion, MI (US); Paul M. Najt, Bloomfield Hills, MI (US); Man-Feng Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/367,050

(22) Filed: Mar. 2, 2006

(65) Prior Publication Data

US 2006/0196469 A1 Sep. 7, 2006

Related U.S. Application Data

(60) Provisional application No. 60/658,375, filed on Mar. 3, 2005.

(51) Int. Cl.
*F02D 43/00* (2006.01)
(52) U.S. Cl. ............... 123/295; 123/305; 123/436; 123/443
(58) Field of Classification Search ......... 123/295, 123/305, 443, 436, 399, 90.15, 568.11, 568.14
See application file for complete search history.

(56) References Cited

U.S. PATENT DOCUMENTS

| 4,446,830 | A | 5/1984 | Simko et al. |
| 5,713,328 | A | 2/1998 | Anderson et al. |
| 5,746,182 | A | 5/1998 | Nada |
| 6,082,342 | A | 7/2000 | Duret et al. |
| 6,155,217 | A | 12/2000 | Shiraishi et al. |
| 6,267,097 | B1 | 7/2001 | Urushihara et al. ......... 123/305 |

(Continued)

FOREIGN PATENT DOCUMENTS

WO  WO 01/46571  6/2001

(Continued)

OTHER PUBLICATIONS

SAE Tech Paper Series #980495, "Fuel Injection Strategies to Increase Full-Load Torque Output of a Direct-Injection SI Engine", Yang and Anderson; Feb. 23-26, 1998.

(Continued)

*Primary Examiner*—Hai Huynh

(57) ABSTRACT

A method is provided for control of a direct-injection engine operated with controlled auto-ignition (HCCI) during load transient operations between modes of lean combustion low load (HCCI/Lean) and stoichiometric combustion medium load (HCCI/Stoich.). The method includes 1) operating the engine at steady state, within a homogeneous charge compression-ignition (HCCI) load range, with fuel-air-exhaust gas mixtures at predetermined conditions, for each speed and load, and controlling the engine during changes of operating mode between one to another of the HCCI/Stoich. medium load mode and the HCCI/Lean lower load mode by synchronizing change rates of predetermined controlled inputs to the current engine fueling change rate.

6 Claims, 42 Drawing Sheets

U.S. PATENT DOCUMENTS

| | | |
|---|---|---|
| 6,286,478 B1 | 9/2001 | Atago et al. |
| 6,336,436 B1 | 1/2002 | Miyakubo et al. |
| 6,386,177 B2 | 5/2002 | Urushihara et al. |
| 6,497,213 B2 | 12/2002 | Yoshizawa et al. |
| 6,619,255 B2 | 9/2003 | Urushihara et al. |
| 6,622,689 B2* | 9/2003 | Hasegawa et al. ........... 123/294 |
| 6,636,197 B1 | 10/2003 | Goldenberg et al. |
| 6,640,771 B2 | 11/2003 | Fuerhapter .................. 123/295 |
| 6,651,616 B1* | 11/2003 | Juretzka et al. ............. 123/305 |
| 6,807,937 B2 | 10/2004 | Gianolio et al. ............ 123/308 |
| 6,895,912 B2 | 5/2005 | Saruwatari et al. ...... 123/90.15 |
| 7,004,116 B2* | 2/2006 | Allen ....................... 123/27 R |
| 7,017,561 B1* | 3/2006 | Liu et al. ............... 123/568.12 |
| 7,021,277 B2* | 4/2006 | Kuo et al. .................. 123/299 |
| 7,089,912 B2* | 8/2006 | Koopmans ............. 123/406.45 |
| 7,128,047 B2* | 10/2006 | Kuo et al. .................. 123/299 |
| 7,171,957 B2* | 2/2007 | Liu et al. ............... 123/568.12 |
| 7,194,996 B2* | 3/2007 | Koopmans .................. 123/295 |
| 2004/0134449 A1 | 7/2004 | Yang |
| 2004/0173180 A1 | 9/2004 | Strom et al. |
| 2004/0182359 A1 | 9/2004 | Stewart et al. |
| 2006/0016421 A1 | 1/2006 | Kuo et al. |
| 2006/0016422 A1 | 1/2006 | Kuo et al. |
| 2006/0016423 A1 | 1/2006 | Kuo et al. |
| 2006/0196466 A1 | 9/2006 | Kuo et al. ................... 123/295 |
| 2006/0196467 A1 | 9/2006 | Kang et al. ................. 123/305 |
| 2006/0196468 A1 | 9/2006 | Chang et al. ............... 123/305 |
| 2006/0196469 A1 | 9/2006 | Kuo et al. ................... 123/305 |
| 2006/0243241 A1* | 11/2006 | Kuo et al. ................... 123/295 |

FOREIGN PATENT DOCUMENTS

| | | |
|---|---|---|
| WO | WO 01/46572 | 6/2001 |
| WO | WO 01/46573 | 6/2001 |

OTHER PUBLICATIONS

U.S. Appl. No. 11/367,045, filed Mar. 2, 2006, Kuo et al.
U.S. Appl. No. 11/366,217, filed Mar. 2, 2006, Kang et al.
U.S. Appl. No. 11/367,047, filed Mar. 2, 2006, Chang et al.

* cited by examiner

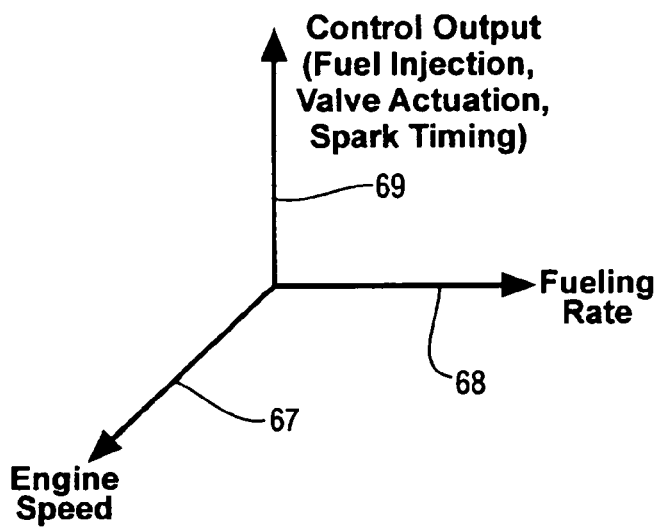

FIG. 6

70 — Tip-Out (14 => 11 mg/cycle):
- 71 — Case 1: 3 mg/sec fuel and 90 %/sec throttle valve change rates
- 72 — Case 2: 3 mg/sec fuel and 50 %/sec throttle valve change rates
- 73 — Case 3: 3 mg/sec fuel and 30 %/sec throttle valve change rates
- 74 — Case 4: 3 mg/sec fuel and 15 %/sec throttle valve change rates
- 75 — Case 5: Step fuel and 40 %/sec throttle valve change rates
- 76 — Case 6: Step fuel and throttle valve change rates
- 77 — Case 7: Same as Case 1 with feed back control off
- 78 — Case 8: Same as Case 6 with feed back control off 80 — Tip-In (11 => 14 mg/cycle):
- 81 — Case 9: 3 mg/sec fuel and 90 %/sec throttle valve change rates
- 82 — Case 10: 3 mg/sec fuel and 50 %/sec throttle valve change rates
- 83 — Case 11: 3 mg/sec fuel and 30 %/sec throttle valve change rates
- 84 — Case 12: 3 mg/sec fuel and 15 %/sec throttle valve change rates
- 85 — Case 13: Step fuel and 40 %/sec throttle valve change rates
- 86 — Case 14: Step fuel and throttle valve change rates
- 87 — Case 15: Same as Case 9 with feed back control off
- 88 — Case 16: Same as Case 14 with feed back control off

FIG. 8

METHOD FOR LOAD TRANSIENT CONTROL BETWEEN LEAN AND STOICHIOMETRIC COMBUSTION MODES OF DIRECT-INJECTION ENGINES WITH CONTROLLED AUTO-IGNITION COMBUSTION

CROSS-REFERENCE TO RELATED APPLICATIONS

This application claims priority from U.S. Provisional Patent Application No. 60/658,375 filed Mar. 3, 2005.

TECHNICAL FIELD

This invention relates to controlled auto-ignition internal combustion engines. More particularly, the invention is concerned with combustion control between lean air-fuel ratio controlled auto-ignition combustion and stoichiometric air-fuel ratio controlled auto-ignition combustion during load transients.

BACKGROUND OF THE INVENTION

To improve thermal efficiency of gasoline internal combustion engines, dilute combustion—using either air or re-circulated exhaust gas—is known to give enhanced thermal efficiency and low NOx emissions. However, there is a limit at which an engine can be operated with a diluted mixture because of misfire and combustion instability as a result of a slow burn. Known methods to extend the dilution limit include 1) improving ignitability of the mixture by enhancing ignition and fuel preparation, 2) increasing the flame speed by introducing charge motion and turbulence, and 3) operating the engine under controlled auto-ignition combustion.

The controlled auto-ignition process is sometimes called the Homogeneous Charge Compression Ignition (HCCI) process. In this process, a mixture of combusted gases, air and fuel is created and auto-ignition is initiated simultaneously from many ignition sites within the mixture during compression, resulting in very stable power output and high thermal efficiency. Since the combustion is highly diluted and uniformly distributed throughout the charge, the burned gas temperature, and hence NOx emission, is substantially lower than that of the traditional spark ignition engine based on propagating flame front, and the diesel engine based on an attached diffusion flame. In both spark ignition and diesel engines, the burned gas temperature is highly heterogeneous within the mixture with very high local temperature creating high NOx emissions.

Engines operating under controlled auto-ignition combustion have been successfully demonstrated in two-stroke gasoline engines using a conventional compression ratio. It is believed that the high proportion of burned gases remaining from the previous cycle, i.e. the residual content, within the two-stroke engine combustion chamber is responsible for providing the high mixture temperature necessary to promote auto-ignition in a highly diluted mixture. In four-stroke engines with traditional valve means, the residual content is low, controlled auto-ignition at part load is difficult to achieve. Known methods to induce controlled auto-ignition at part load include: 1) intake air heating, 2) variable compression ratio, and 3) blending gasoline with fuel that has wider auto-ignition ranges than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation to obtain the necessary conditions for auto-ignition in a highly diluted mixture. Various fueling controls including split and single injections have been proposed for use in conjunction with valve control strategies to maintain stable auto-ignition combustion across a variety of engine load conditions.

In commonly assigned U.S. patent application Ser. No. 10/899,457 an exemplary fuel injection and valve strategy for stable, extended controlled auto-ignition is disclosed. Therein, during operation with low part load, a first injection of fixed amount of fuel during the negative valve overlap period is followed by a second fuel injection during the subsequent compression stroke. The injection timing for the first injection retards and the injection timing for the second injection advances in a continuous manner as the engine load increases. During operation with intermediate part load, a first injection of fuel during the negative valve overlap period followed immediately by a second injection of fuel during the subsequent intake stroke supports auto-ignition. Optimal separation of the two injections is around 30 to 60 degrees crank angle. The injection timings of both injections retard in a continuous manner as the engine load increases. And, during operation with high part load, a single fuel injection during the intake stroke supports auto-ignition. The injection timing retards as the engine load increases.

Lean air-fuel ratio operation is the preferred mode from low load to high part loads for best fuel economy. However, as the engine load or fueling rate increases, the engine-out NOx emission also increases. Up to certain engine load, the level of NOx emission can be kept below a limiting value. The NOx aftertreatment conversion efficiency reduces drastically if a traditional three-way after treatment device is used with lean engine operation. A switch from lean to stoichiometric engine operation is therefore necessitated at some point as load increases such that the traditional three-way after treatment device can be used for effective NOx emission control.

Further extension of the mid load operation limit of a gasoline direct-injection controlled auto-ignition combustion engine that is capable of using a conventional three-way after-treatment system as an emission control device can be achieved by employing a fuel injector with multiple injection capability and a spark plug. A first fuel injection occurs during early intake stroke to form a lean air-fuel mixture throughout the combustion chamber near the end of the compression stroke. A second fuel injection occurs in either the later part of the intake stroke or the compression stroke to create a stratified air-fuel mixture with ignitable mixture near the spark plug. The spark plug is used to ignite the ignitable mixture and its timing strongly influences the combustion phasing. The spark-ignition combustion works as an ignition source to trigger the auto-ignition of the surrounding lean mixture to burn at a target crank angle after TDC of the compression stroke. In this way, a mixed-mode combustion process that consists of two separate yet related processes is realized. Further, the engine is operated at the stoichiometric air fuel ratio with external EGR dilution so a traditional after-treatment device is sufficient for engine-out emission control. The external EGR dilution also acts as an effective combustion rate control parameter during the auto-ignition combustion phase. The high load limit of a gasoline direct-injection controlled auto-ignition combustion engine is expanded by more than 10% with acceptable maximum rate of pressure rise or amplitude of pressure oscillation.

While the advances outlined above have successfully demonstrated controlled auto-ignition capabilities at steady state conditions, rapid load changes or transients may introduce undesirable combustion results. Commonly assigned and U.S. patent application Ser. No. 60/658376 describes a system and method for robust auto-ignition combustion control during load transients from low load to high part load. For engine operations with lean air-fuel ratio without external EGR, feed forward control with lookup tables and rate limiters is sufficient to ensure no misfiring and partial-burn during low load to high part load (and vice versa) transitions. However, load transitions between high part load and medium load continue to present challenges with respect to misfiring or partial-burns.

SUMMARY OF THE INVENTION

The present invention relates to a method for robust gasoline direct-injection controlled auto-ignition combustion control during load transition between high part load and medium load. This transition involves a combustion mode change between controlled auto-ignition with lean air-fuel ratio (CAI/Lean) and CAI with stoichiometric air-fuel ratio (CAI/Stoich.). The method is capable of handling the transition of engine operations between lean and stoichiometric air-fuel ratio for NOx emission control and between open and closed EGR valve for knock control. Using a combination of feed forward control with lookup tables including fuel injection fueling rate and timing, variable valve actuation, spark, throttle and EGR valve positions in conjunction with feedback control using NVO and EGR valve position, the auto-ignition combustion is always stable during load transients without misfiring and partial-burns with the present invention.

A feed forward control may be provided with which inputs to the engine, including spark timing, fuel injection timing, and valve timing, are continually set equal to steady state inputs corresponding to the current fueling rate. Precalibrated steady state inputs are stored in lookup tables, and inputs to the engine are determined by interpolating values of steady state inputs in the lookup tables based on the current fueling rate. Rate limiters are used to compensate different dynamics in the system, such as by controlling the rates of air and fuel delivery to synchronize with the desired transients.

A feedback control may be provided to adjust the outputs of the feed forward control to more closely match the desired input settings for optimum performance.

These and other features and advantages of the invention will be more fully understood from the following description of certain specific embodiments of the invention taken together with the accompanying drawings.

BRIEF DESCRIPTION OF THE DRAWINGS

FIG. 6 is a graph showing the detailed structure of the lookup table used in the feed forward control:

FIG. 8 is a chart summarizing 16 test cases of transitions from CAI/Lean to CAI//Stoich. operation and vice versa.

DESCRIPTION OF THE PREFERRED EMBODIMENT

For simplicity, the following descriptions will address the present invention in its application to a single cylinder direct-injection gasoline four-stroke internal combustion engine, although it should be appreciated that the present invention is equally applicable to a multi-cylinder direct-injection gasoline four-stroke internal combustion engines. A four-stroke, single cylinder, 0.55 liter, internal combustion engine was utilized in implementing the various controls and acquisition of the various data embodied herein. Unless specifically discussed otherwise, all such implementations and acquisitions are assumed to be carried out under standard conditions as understood by one having ordinary skill in the art. The present invention is described in its application to a two valves per cylinder engine (one intake and one exhaust valve), although it should be appreciated that the present invention is equally applicable to a multi-valve per cylinder engine. And, although the present invention is applicable to any variable valve actuation (VVA) strategy using either a fully flexible electro-hydraulic or an electro-mechanical system, the example used below to illustrate our control strategy is based on a two-step with dual cam phasing VVA system.

Figure 1:
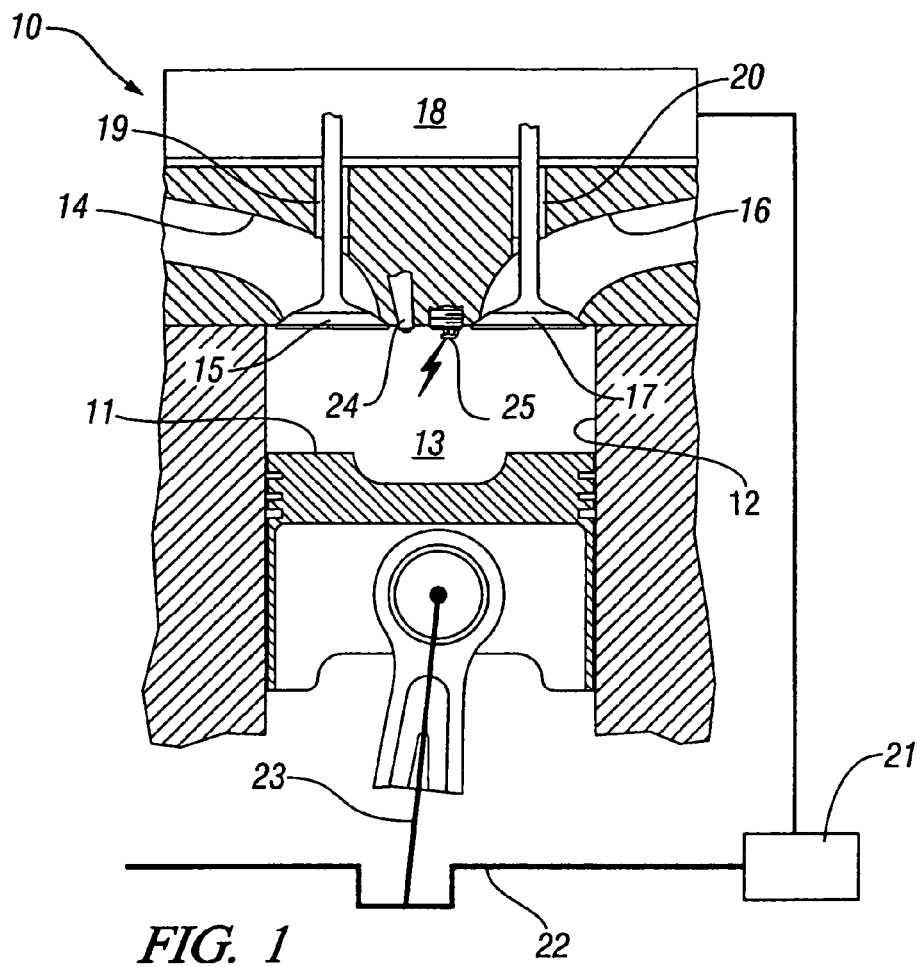
FIG. 1 is a schematic illustration of a single cylinder gasoline direct-injection four-stroke internal combustion engine capable of being operated according to the present invention.

Referring first to FIG. 1 of the drawings in detail, numeral 10 generally indicates a schematic representation of an exemplary single-cylinder direct-injection four-stroke internal combustion engine. In the figure, a piston 11 is movable in a cylinder 12 and defines with the cylinder 12 a variable volume combustion chamber 13. An intake passage 14 supplies air into the combustion chamber 13. Air flow into the combustion chamber 13 is controlled by an intake valve 15. Combusted gases can flow from the combustion chamber 13 via an exhaust passage 16, controlled by an exhaust valve 17.

Exemplary engine 10 has a hydraulically controlled valve train with an electronic controller 18, which is programmable and hydraulically controls the opening and closing of both the intake 15 and exhaust 17 valves. The electronic controller 18 will control the movement of the intake valve 15 and exhaust valve 17 having regard to the positions of the intake and exhaust valves 15 and 17 as measured by two position transducers 19 and 20. The controller 18 will also refer to the angular position of the engine, as indicated by a rotation sensor 21 connected to the engine crankshaft 22. The crankshaft 22 is connected by a connecting rod 23 to the piston 11 reciprocating in the cylinder 12. A gasoline direct injector 24, controlled by the electronic controller 18, is used to inject fuel directly into the combustion chamber 13. The various functions ascribed to the controller 18 may equally well be performed by a plurality of separate but coordinated controllers adapted for the various tasks.

A spark plug 25, controlled also by the electronic controller 18, is used to enhance the ignition timing control of the engine at certain conditions (e.g. during cold start and near the low load operation limit). Also, it has proven preferable to rely on spark ignition near the high part-load operation limit under controlled auto-ignition combustion and during high speed/load operating conditions with throttled or non-throttled SI operation.

Figure 2:
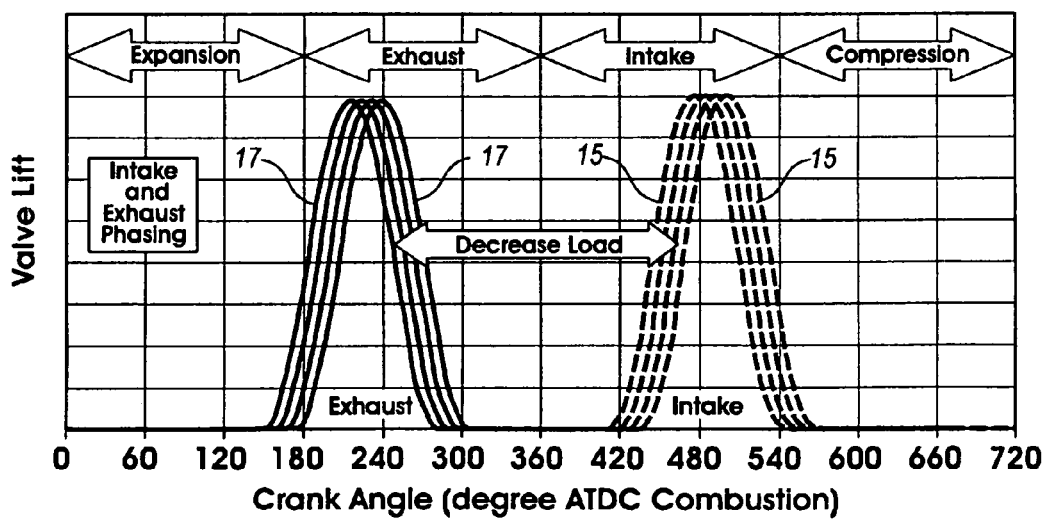
FIG. 2 is a graph of valve lift vs. crank angle for the phasing of exhaust and intake valves of a four-stroke internal combustion engine operating at different loads according to exemplary controlled auto-ignition control using two-step variable valve actuation with dual-equal cam phasing.

FIG. 2 illustrates the control motions of the intake valve 15 and exhaust valve 17 wherein the valve lift profiles are shown as a function of crank angle for the exhaust 17 and intake 15 valves of the four-stroke internal combustion engine operating with exemplary controlled auto-ignition (HCCI combustion) controls.

Motion of the exhaust valve is shown by the solid lines 17 and motion of the intake valve is indicated by the dashed lines 15. The exhaust valve 17 closes early, at a variable angle before the exhaust/intake top dead center (TDC 360 degrees) and the intake valve 15 opens late, preferably at an equal angle after TDC. The interim period when both valves are closed is referred to as negative valve overlap (NVO). The paired exhaust/intake valve profiles 17, 15, ranging from the pair closest together to the pair furthest apart represent increasing NVO with decreasing engine loads (NMEP) of, sequentially, 350, 285, 215 and 144 kPa. This valve motion can be achieved using a dual cam phasing system, or by any other devices that can generate such valve profiles.

With this strategy, the negative valve overlap (NVO) is varied by phasing of both intake and exhaust lift profiles simultaneously. It is experimentally confirmed that for maintaining optimal auto-ignition combustion throughout the load range, the required negative valve overlap period increases linearly with decreasing engine load, which relationship is illustrated in FIG. 2.

Figure 3A:
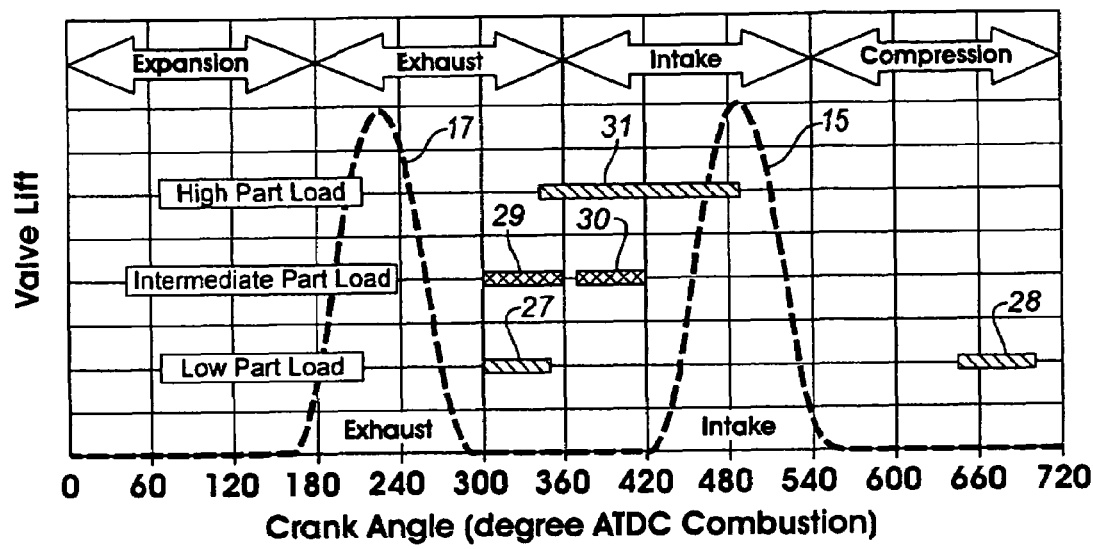
FIG. 3A is a graph of typical intake and exhaust valve events vs. crank angle with exemplary controlled auto-ignition injection strategies for engine operation with low, intermediate, and high part loads, respectively.

FIG. 3A shows exemplary injection strategies during engine operation with low, intermediate, and high part loads, respectively. Also shown in FIG. 3A are exemplary intake and exhaust valve events and, in FIG. 3B is shown in-cylinder pressure history in accordance with such exemplary valve events.

During operation with low part load, the fuel is injected two times during a single engine cycle as indicated by spaced bars 27, 28. The first injection 27, between about 300 and 350 degrees ATDC combustion, sprays a fixed amount of gasoline or equivalent fuel into the high temperature and pressure exhaust gas trapped in the cylinder during the negative valve overlap period. The injection timing for the first injection is retarded in a continuous manner as the engine load increases. The fuel is partially oxidized and converted to more reactive chemical species and energy is released. The amount of the more reactive chemical species and energy varies with the quantity and timing of fuel injected in the first injection and the negative valve overlap (NVO) period.

Figure 3B:
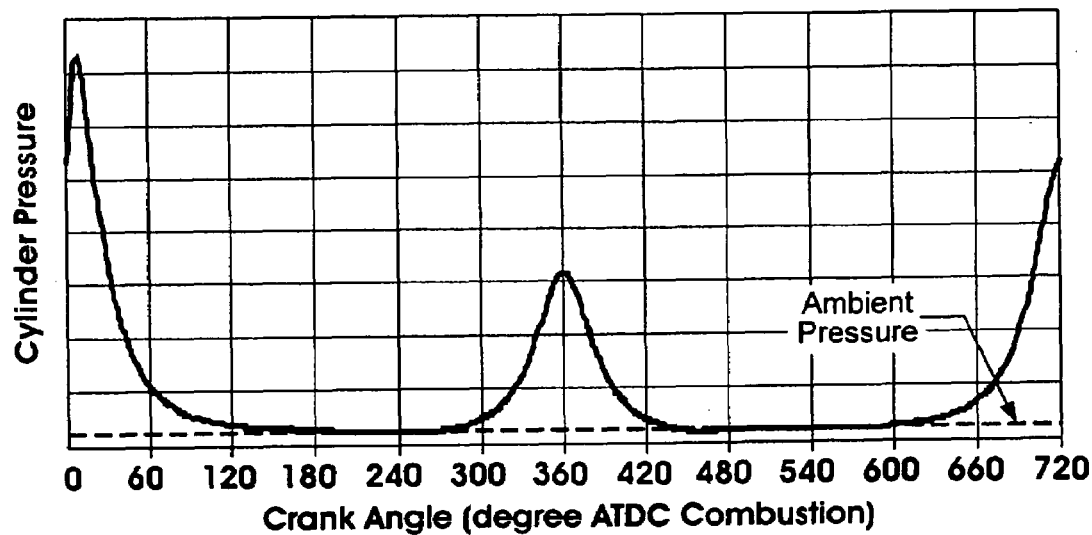
FIG. 3B is a graph of a typical in-cylinder pressure history vs. crank angle for exemplary controlled auto-ignition exhaust recompression valve strategy.

As shown in FIG. 3B, the trapped gases are first compressed in the NVO period toward the end of the exhaust stroke between about 300 and 360 degrees ATDC, after the exhaust valve closes. The compressed fuel and exhaust gas mixture is then expanded during the early part of the intake stroke when both the intake and exhaust valves are closed. The cylinder pressure drops to around the ambient pressure at which time the intake valve opens to induct fresh air into the combustion chamber. During the compression stroke, the fuel injector is activated again at 28 for a second injection of gasoline into the combustion chamber between 60 and 20 degrees BTDC combustion. This injection timing is chosen to ensure smoke-free operation and is affected by either the injector spray cone angle or the amount of fuel injected.

The injection timing for the second injection is advanced in a continuous manner as the engine load increases. Penetration and dispersion of the fuel spray are suppressed due to higher in-cylinder charge temperature and density. A localized rich mixture region is formed in the combustion chamber. The species formed by gasoline reforming after the first fuel injection works in conjunction with the localized rich mixture formed by the second fuel injection to accomplish the auto-ignition of gasoline under a relatively low compression ratio without any help of spark, as compared to a relatively high compression ratio used in a diesel engine.

During operation with intermediate part load, the fuel injector is also activated twice during a single engine cycle as shown by adjacent bars 29, 30. The first injection 29 sprays gasoline into the combustion chamber between about 300 and 360 degrees ATDC combustion, similar to that used in the operation with low part load. The second injection 30, however, starts about 30 to 60 degrees after the end of the first injection. Both injections are performed during the negative valve overlap period and early intake stroke. The injection timings of both injections are retarded in a continuous manner as the engine load increases. The objective is to use split injection for controlling gasoline reforming, and thus the auto-ignition process. For both low and intermediate part load operations, 1-3 mg of fuel is sufficient for the first injection 29. The remaining fuel is injected during the second injection 30.

During operation with high part load, the fuel injector is activated only once during a single engine cycle, as shown by bar 31. The injection timing varies between 340 and 490 degrees ATDC combustion depending on the engine load. The injection timing is retarded as the engine load increases.

Transition from one injection strategy to another during load change is regulated to benefit both engine performance and emissions. For example, during operation with low part load, split injection—with the first injection 27 during the negative valve overlap period and the second injection 28 during the compression stroke—is the only injection strategy that has proved capable of generating stable controlled auto-ignition combustion. The injection timing for the second injection 28 is advanced continuously with increasing engine load to promote dispersion of fuel within the cylinder content and to keep the air/fuel ratio of the localized mixture within an acceptable range to avoid excessive emissions of NOx and smoke.

However, even with the advanced injection timing, formation of nitrogen oxides (NOx) can still rise to unacceptable levels during operation at intermediate part load. Thus, with intermediate part load, the injection timing of the second fuel injection 30 is switched from the compression stroke to the intake stroke as shown in FIG. 3A. It is confirmed experimentally that both strategies result in similar engine performance. Although the NOx emission can be greatly reduced with the second fuel injection 30 during the intake stroke, the HC emission increases due to an increase in the crevice-trapped fuel that escapes combustion. The exact load where the transition takes place will be determined by emissions tradeoff.

Figure 4:
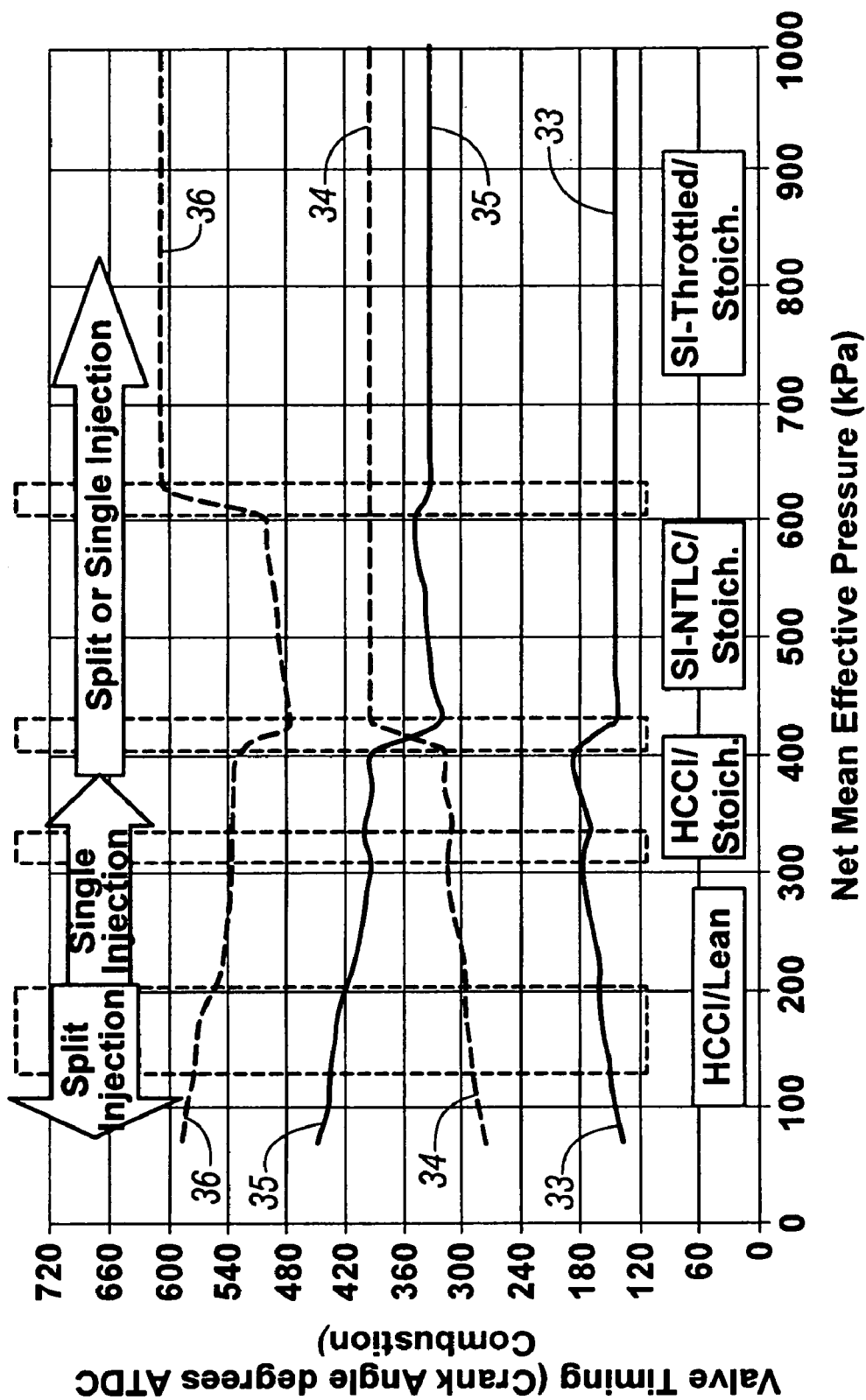
FIG. 4 is a graph of exemplary overall operating strategy vs. engine load for exhaust and intake valves, fuel injection and operation mode for a single cylinder four-stroke internal combustion engine operating according to exemplary controlled auto-ignition controls using a two-step with dual cam phasing variable valve actuation system.

FIG. 4 shows exemplary opening and closing valve timings as a function of engine load for the exhaust and intake valves of a single cylinder four-stroke internal combustion engine operating at a constant speed. The valve control exemplifies exhaust recompression using a two-step with dual cam phasing VVA system. Exhaust valve openings over the load range (NMEP) are shown by a solid line 33 and exhaust valve closings by a dashed line 34. Intake valve openings are shown by a solid line 35 and intake valve closings by a dashed line 36. Also shown in FIG. 4 are the injection strategy (split vs. single) and various combustion modes as a function of engine load at an exemplary constant speed.

In particular, the engine is operated in the controlled auto-ignition combustion mode with lean air/fuel mixture (HCCI/Lean) below 320 kPa NMEP. During this combustion mode, the NOx emission index increases with increasing engine load. At 320 kPa NMEP, the NOx emission index is around 1 g/kg fuel. Accordingly, between 320 and 400 kPa NMEP, the engine is operated in the controlled auto-ignition combustion mode with stoichiometric air/fuel ratio (HCCI/Stoich.) to allow the use of a traditional after treatment device for NOx control. Split injection may be used in the higher load portion of this mode to limit the maximum rate of cylinder pressure rise.

Between 400 and 600 kPa NMEP, the engine is operated in a spark-ignition, non-throttled stoichiometric mode with load controlled by VVA strategies such as early intake valve closing (SI-NTLC/Stoich, as shown) or late intake valve closing. Beyond 600 kPa NMEP, the engine is operated in a traditional spark-ignition and throttled combustion mode with stoichiometric air/fuel mixture (SI-Throttled/Stoich) until reaching full load. Split injection may be utilized in either of the latter two modes in order to limit the maximum rate of cylinder pressure rise.

It should be pointed out that the calibration values in FIG. 4 are essentially the values for 1000 rpm in the lookup table of FIG. 6, to be subsequently discussed. For different engine speeds, similar operating strategies in fuel injection, valve timing, and combustion to those shown in FIG. 4 are observed experimentally with differences only in the exact NMEP values where various transitions should take place. In general, the NMEP values reported in FIG. 4 for the various transitions decrease with increasing engine speed. In particular, the high load operating limit decreases with increasing engine speed due to less engine heat loss. Thus, the range of controlled auto-ignition combustion also decreases with increasing engine speed.

In a controlled auto-ignition engine, combustion phasing is strongly affected by charge temperature, e.g., higher charge temperatures advance combustion phasing and may result in knocking, while lower charge temperatures retard combustion phasing and may result in partial-burn or misfire. Transition of engine operations between lean and stoichiometric air-fuel ratio for NOx emission control and between open and closed EGR and throttle valves for air-fuel ratio and knock control is addressed in accordance with the present invention. Using a combination of feed forward control with look-up tables and rate limiters, including fuel injection timing (FI), variable valve actuation, spark timing (SI), throttle valve and EGR valve positions in conjunction with feedback control using negative valve overlap (NVO) and EGR valve position, the controlled auto-ignition combustion is robust during load transients without misfiring or partial burns in accordance with the present invention.

Figure 5:
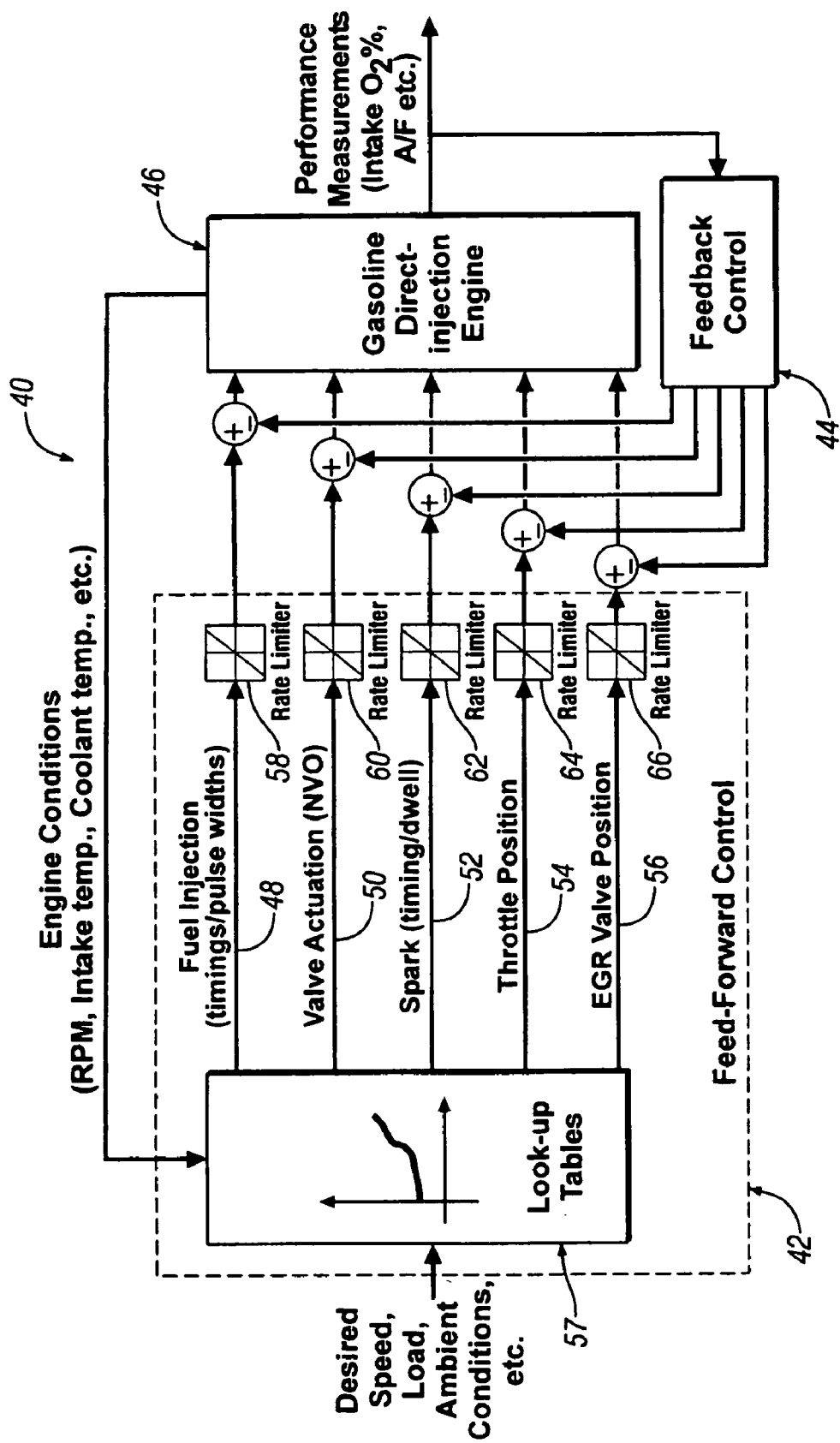
FIG. 5 is a diagrammatic view of an exemplary controller with which robust controlled auto-ignition combustion is maintained during various load transients in accordance with the present invention.

FIG. 5 shows a schematic diagram of an engine controller 40, according to the invention, with which robust controlled auto-ignition combustion is achieved during load transients with either a constant or variable engine speed. The controller 40 includes a feed forward control 42 and a feedback control 44, connected with associated components of a representative gasoline direct-injection engine 46.

The feed forward control 42 achieves a fast system response and it includes two major elements, lookup tables and rate limiters. Based on the desired load and engine operating mode conditions, required fuel injection timings (FI) and pulse widths (fueling rate) 48, valve actuation (including negative valve overlap (NVO)) 50, spark timing (SI) 52, throttle position 54, and EGR valve position 56 are calculated from the lookup tables 57 to control the combustion phasing. Also, depending on the current engine operating conditions and driver's load demand, variable rate limiters 58, 60, 62, 64, 66 are used to compensate different dynamics in the system, e.g., air and fuel dynamics, as will be discussed later in detail.

FIG. 6 is an operational diagram of a lookup table in which two input variables are engine speed 67 and fueling rate 68 and control output variables 69 include fuel injection, valve actuation, and spark timing. It should be noted that, unlike the more conventional SI engines, the fueling rate is not necessarily proportional to the driver-requested torque (or load, which is based on the pedal input) for the proposed application. Due to the more complex nature of many possible combustion modes, it is not uncommon that an SIDI/HCCI engine actually produces more torque for slightly less fueling rate when the engine speed increases, and vice versa. It is crucial to determine the proper injection strategy and the fueling rate for each combustion mode depending on the requested torque and engine operating condition as will be discussed later. Therefore, it should be understood that the different fueling rates used in the tests reported hereafter are intended only to demonstrate the load transient control methodology under varying engine loads. The exact mapping from the driver-requested engine torque to the required fueling rate must be developed for the operational conditions of each engine model.

Figure 7:
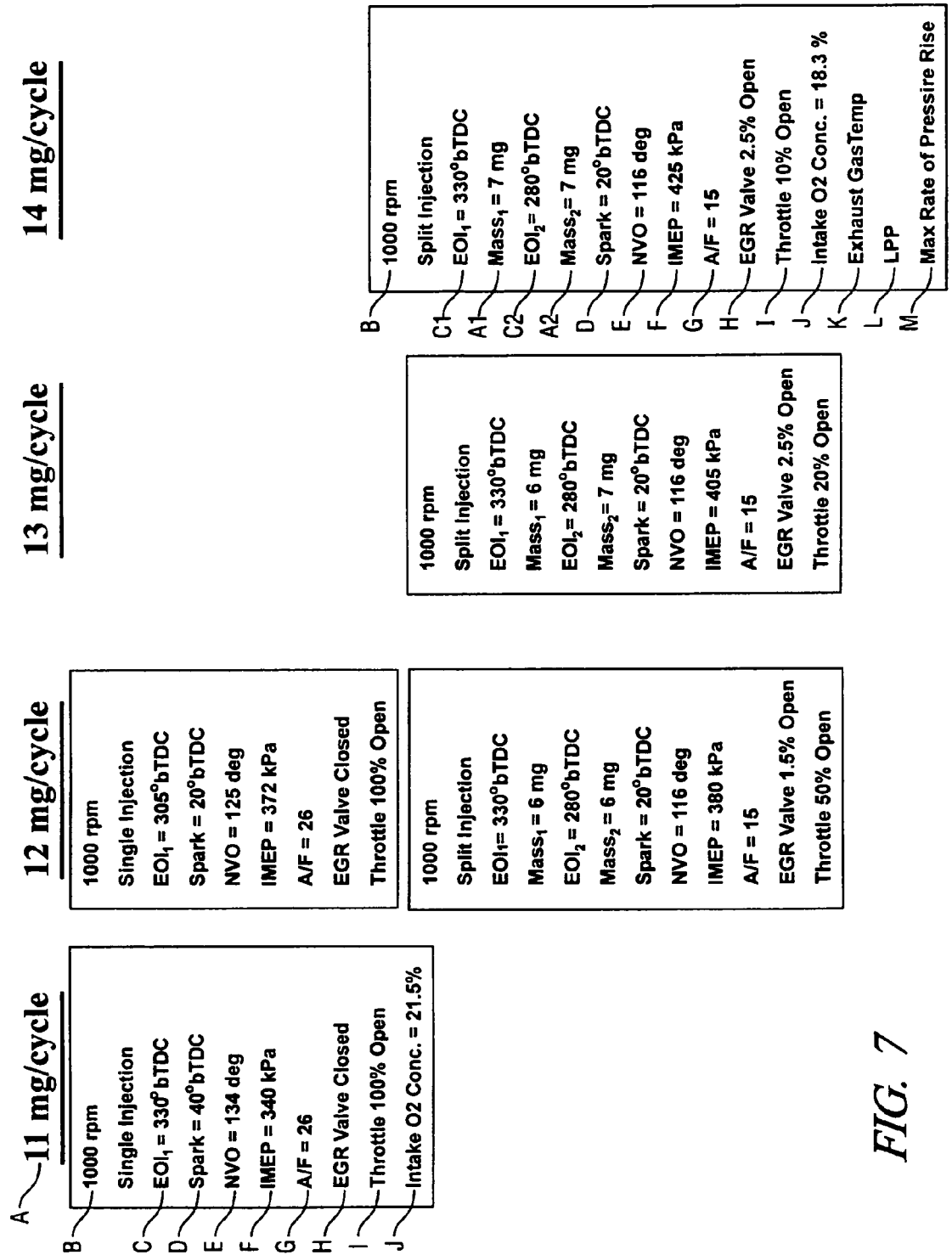
FIG. 7 is a chart of control inputs to an engine controller at four discrete fueling rate points from 11 to 14 mg/cycle under steady state operation.

The effectiveness of the present invention is demonstrated using the test results with load transition between 11 and 14 mg/cycle. FIG. 7 shows control inputs to the engine controller at the four discrete fueling rate points under steady state operation. Sixteen test cases were performed which are summarized in FIG. 8. Cases 1 to 8 are for load reduction transitions from 14 to 11 mg/cycle, also known as tip-out. Cases 9-16 are for load increase transitions from 11 to 14 mg/cycle, also known as tip-in.

In FIGS. 7 to 45, and FIG. 8 in particular, reference numeral 70 identifies the load reduction transitions (tip-out) and cases 1-8 carry numerals 71-78, respectively. Load increase transitions (tip-in) 80 include cases 9-16 with numerals 81-88, respectively. In FIG. 7 and the following figures, letters are used for command inputs and other measured values as follows: A—fuel rate; A1—first injection; A2—second injection; B—engine rpm; C1—end of first injection; C2—end of second injection; D—SI; E—NVO; F—IMEP; G—A/F; H—EGR valve position; I—throttle position; J—intake $O_2$ percent; K—exhaust gas temperature; L—LPP (location of peak pressure); and M—max. rate of pressure rise.

During tip-out, controlled auto-ignition combustion is quite robust for load transition from stoichiometric (high load) to lean (low load) operation. No misfiring or partial burn is exhibited, even with the feedback control turned off. In contrast, however, during tip-in, load transition from lean (low load) to stoichiometric (high load) operation, feedback control is necessary or misfiring and partial burns can occur.

Figure 9:
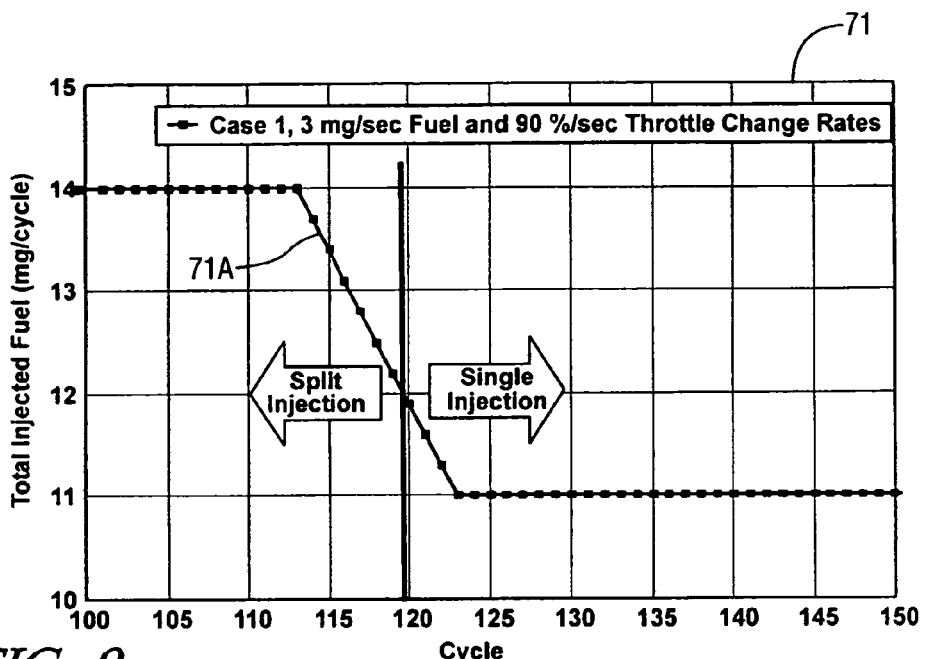
FIGS. 9-11 are graphs of various command inputs for case 1 of FIG. 8.
Figure 10:
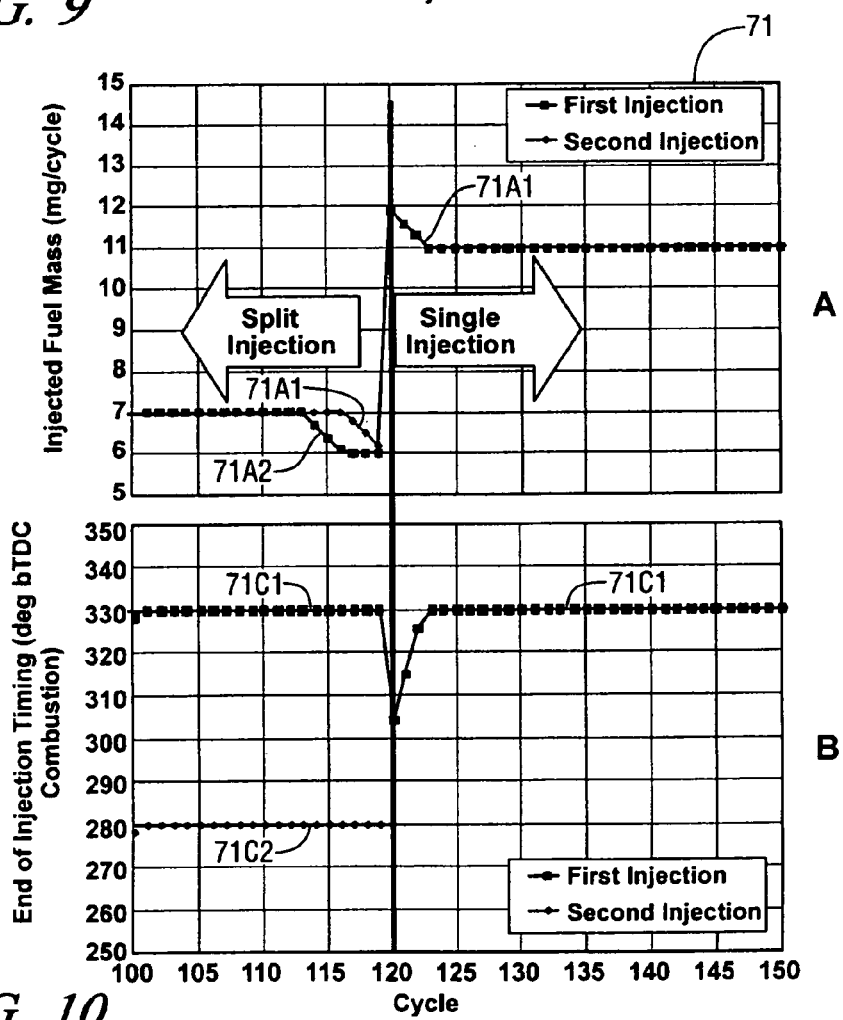
Figure 11:
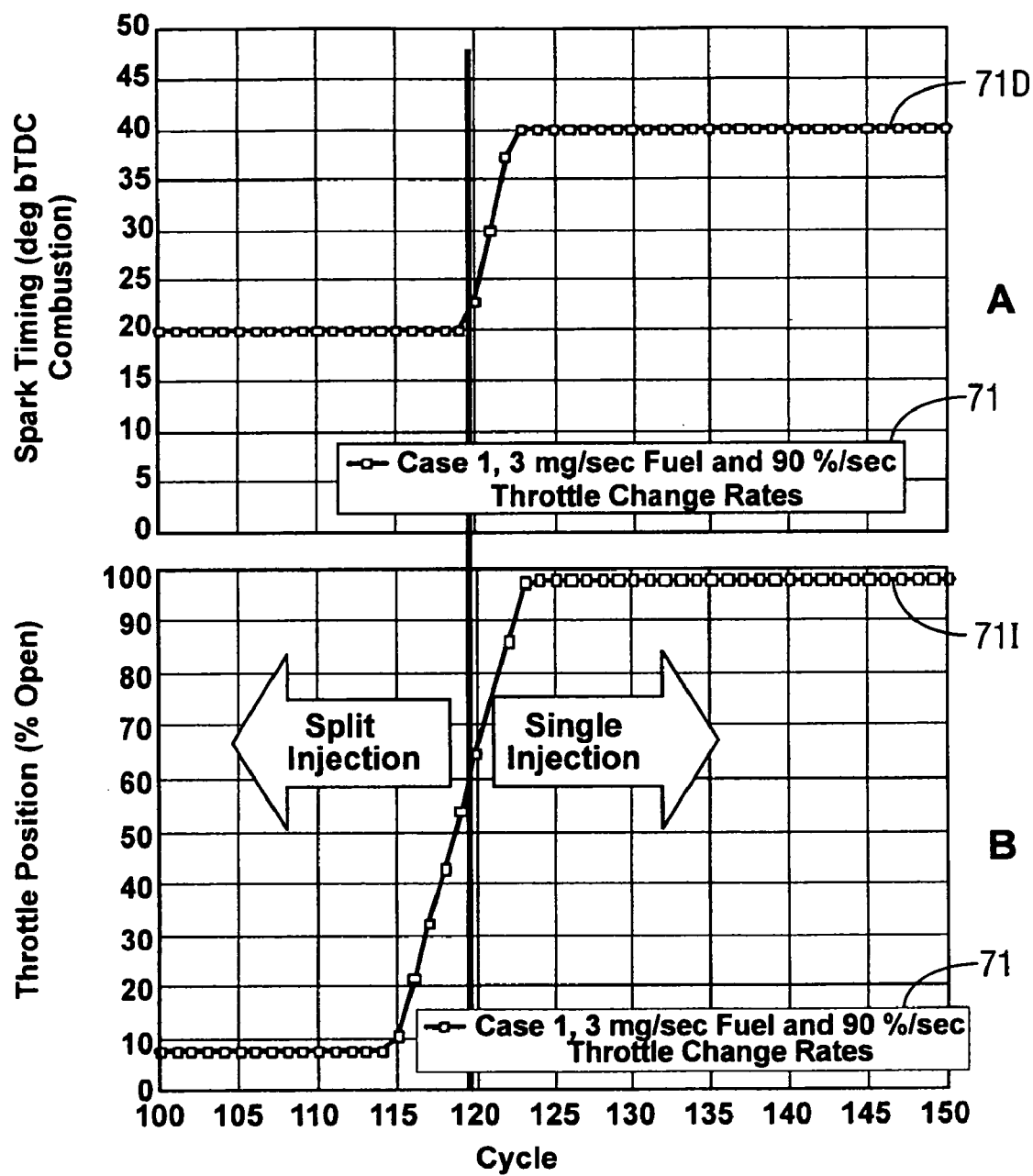
Figure 12:
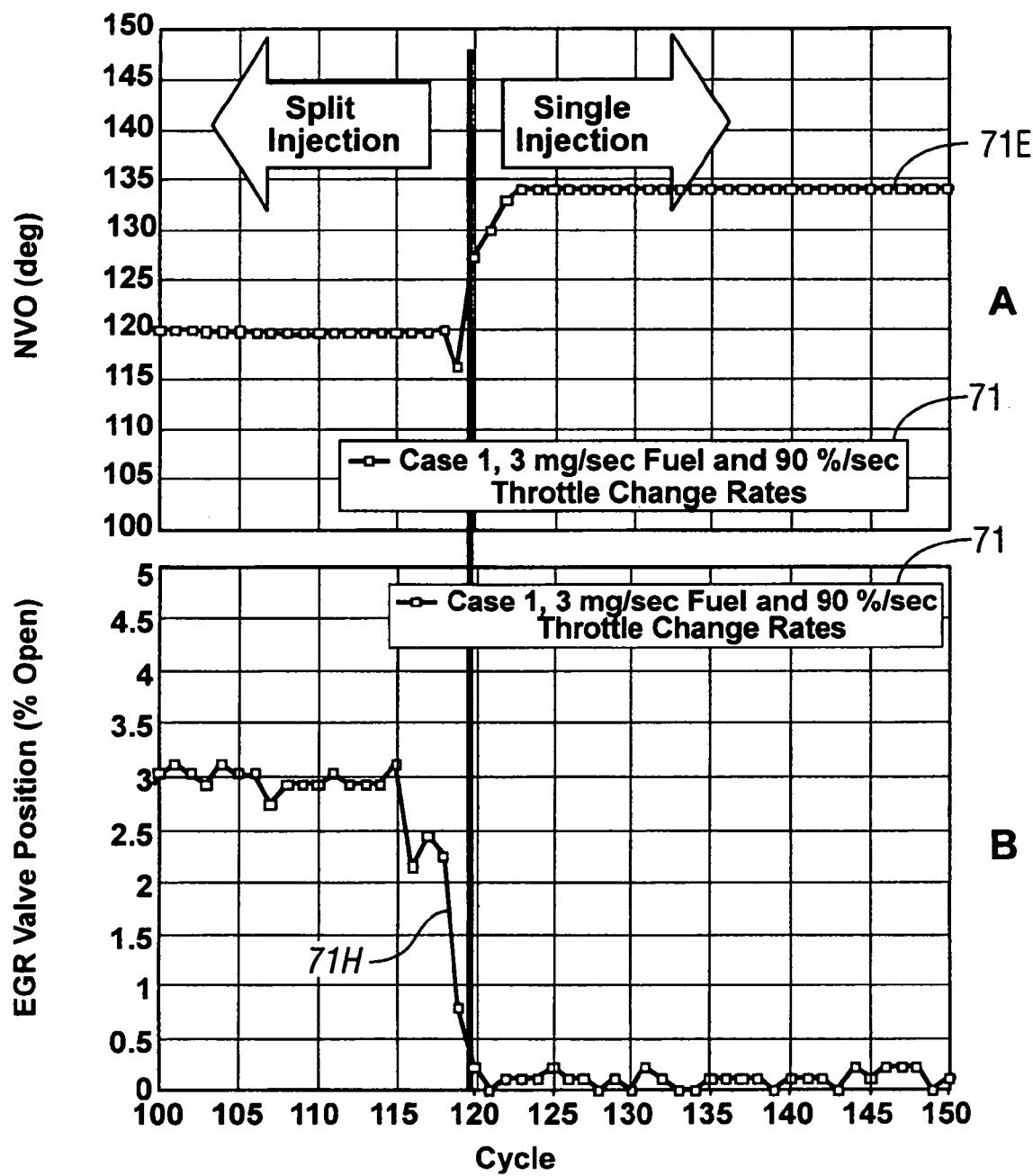
FIGS. 12A and B are graphs of command inputs of NVO and EGR during the load transient of case 1.
Figure 13:
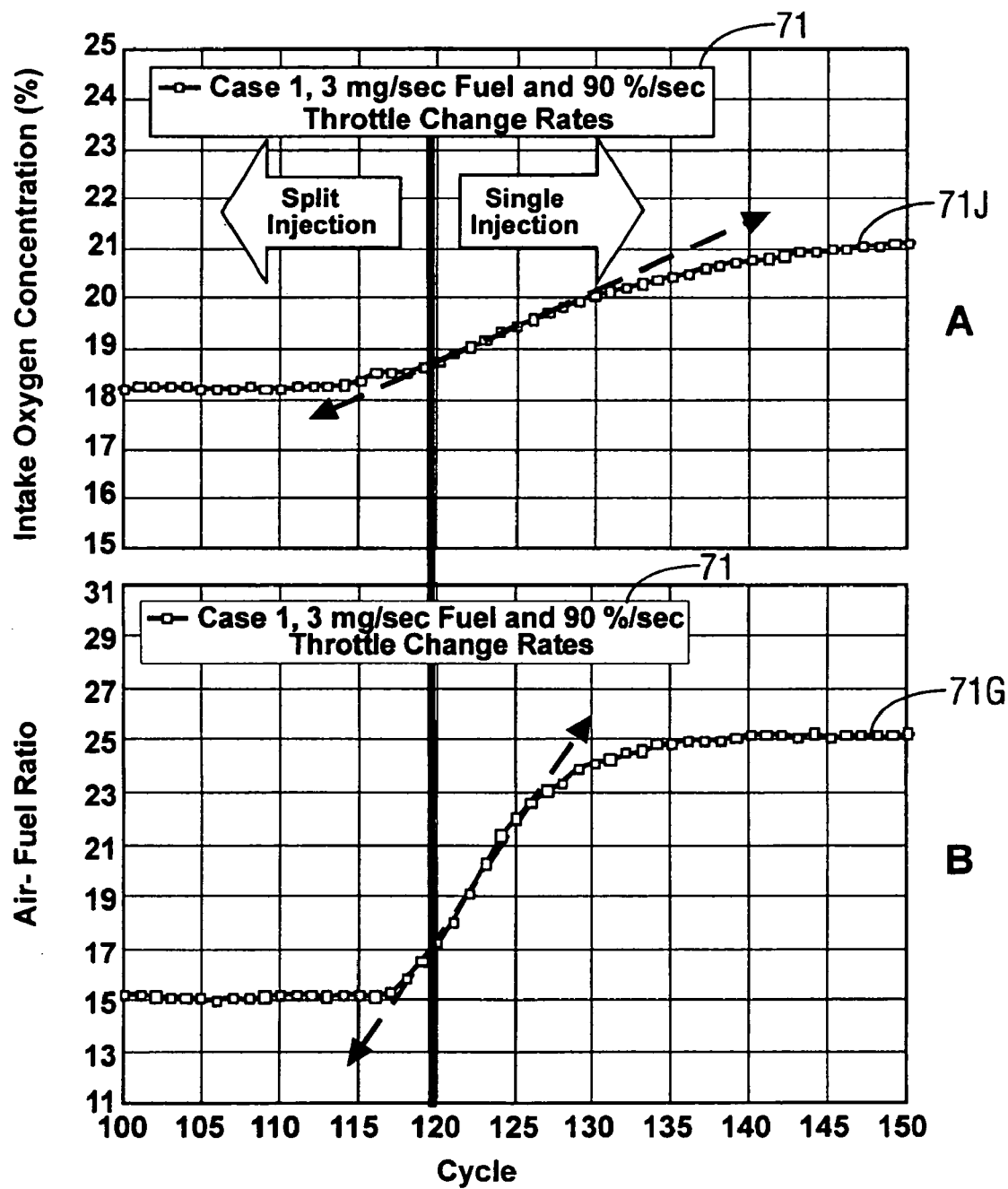
FIGS. 13A and B are graphs of percent intake $O_2$ and air-fuel ratio vs. engine cycles with feedback control in operation.
Figure 14:
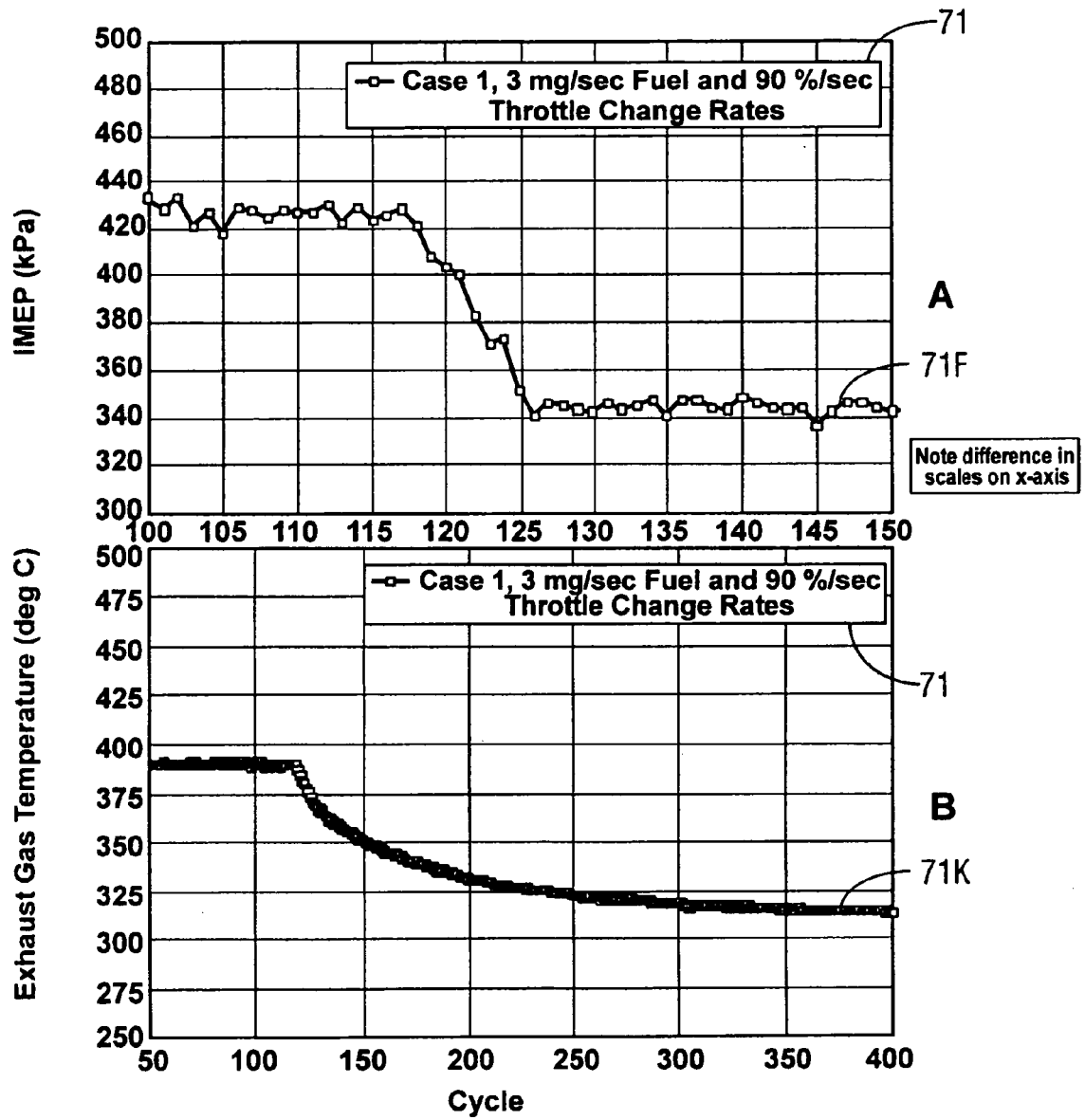
FIGS. 14A and B are graphs of measured IMEP and exhaust gas temperature vs. engine cycles for case 1.
Figure 15:
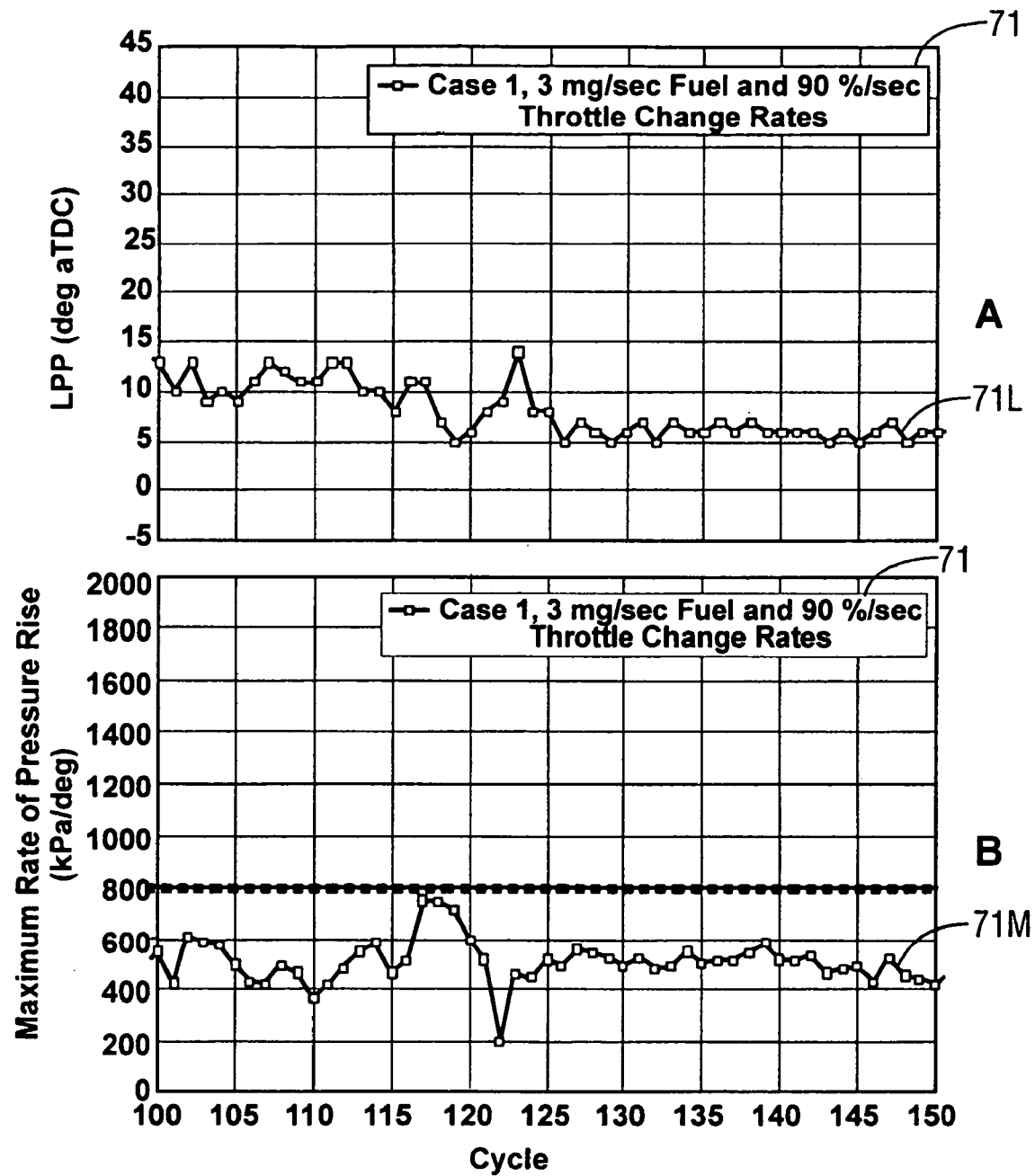
FIGS. 15A and B are graphs of measured location of peak pressure (LPP) and maximum rate of pressure rise vs. engine cycles for case 1.

FIGS. 9-11 show variations of command inputs of fuel injection and spark timing during the decreasing load transient for the baseline case 1. In particular, line 71A of FIG. 9 shows the fuel injection schedule for 71 (case 1) transition from 14 to 11 mg/cycle with 3 mg/sec fuel change rate. Split injection strategy is used for fueling rates above 12 mg/cycle with switch over to single injection strategy afterwards. In other words, the load transition is completed in 1 sec.

FIGS. 10A and 10B show details of fuel injection mass distribution during split and single injection and its corresponding timing, respectively. Line 71A1 indicates the first or only injection fuel mass while 71A2 is the second injection fuel mass of split injections. Similarly, lines 71C1 and 71C2 show end of single and split fuel injection timings.

FIGS. 11A, line 71D and 11B, line 71I, show command inputs for spark timing and throttle valve position, respectively. Linear interpolations of lookup table values shown in FIG. 7 at the discrete fueling rate points are clearly demonstrated.

FIGS. 12A and 12B show command inputs for NVO line 71E and EGR valve position line 71H during load transient. At 14 mg/cycle, both NVO and EGR valve position are slightly different from those given in FIG. 7 under steady state operation before the transient tests. This is the result of feedback control where both NVO and EGR valve positions are varied from cycle to cycle in order to control both intake oxygen concentration (FIG. 13A line 71J) and exhaust air-fuel ratio (FIG. 13B line 71G). Controlled auto-ignition combustion is then repeated. It is clear from FIGS. 13A and 13B that both measured intake $O_2$ concentration and exhaust air-fuel ratio are equal to their corresponding steady-state values shown in the lookup table.

FIG. 14A line 71F shows measured IMEP of case 1 for load transition from 14 to 11 mg/cycle with 3 mg/sec fuel and 90%/sec throttle change rates. It can be seen that the controlled auto-ignition combustion is robust throughout the load transient without misfiring or partial-burn. FIG. 14B line 71K shows the corresponding measured exhaust gas temperature. It is clear from the figure that the time needed to reach steady state after transition is much longer for the exhaust gas temperature than for the IMEP (note the different scales used on the horizontal axis).

FIGS. 15A line 71L and 15B line 71M show measured LPP and maximum rate of pressure rise, respectively, of case 1 for load transition from 14 to 11 mg/cycle with 3 mg/sec fuel and 90%/sec throttle change rates. Note that the maximum rate of pressure rise is always below the 800 kPa/deg threshold throughout the load transient, thus no audible knock is observed.

Figure 16:
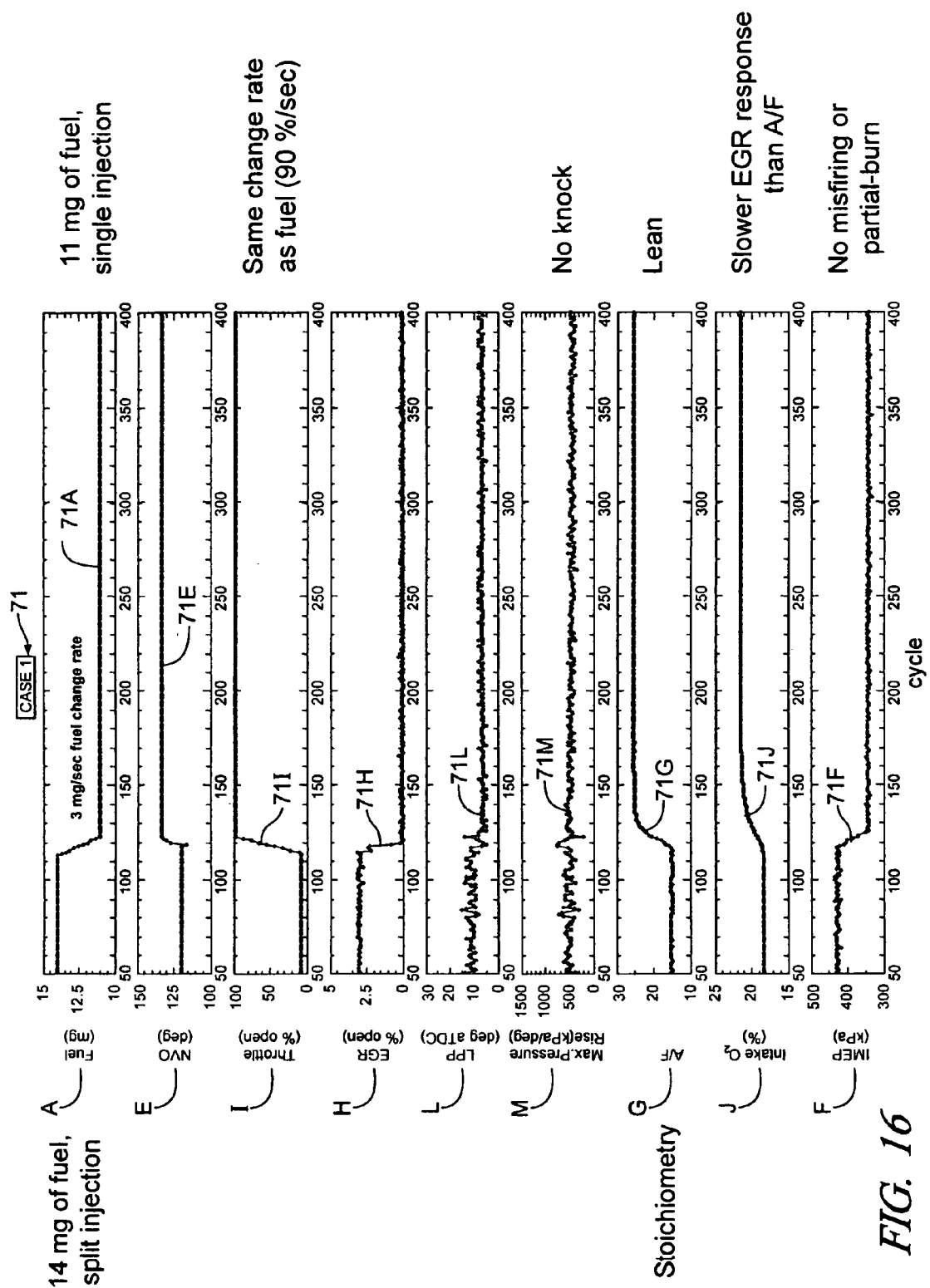
FIG. 16 is a composite graph of case 1 plotted in FIGS. 9-15.
Figure 17:
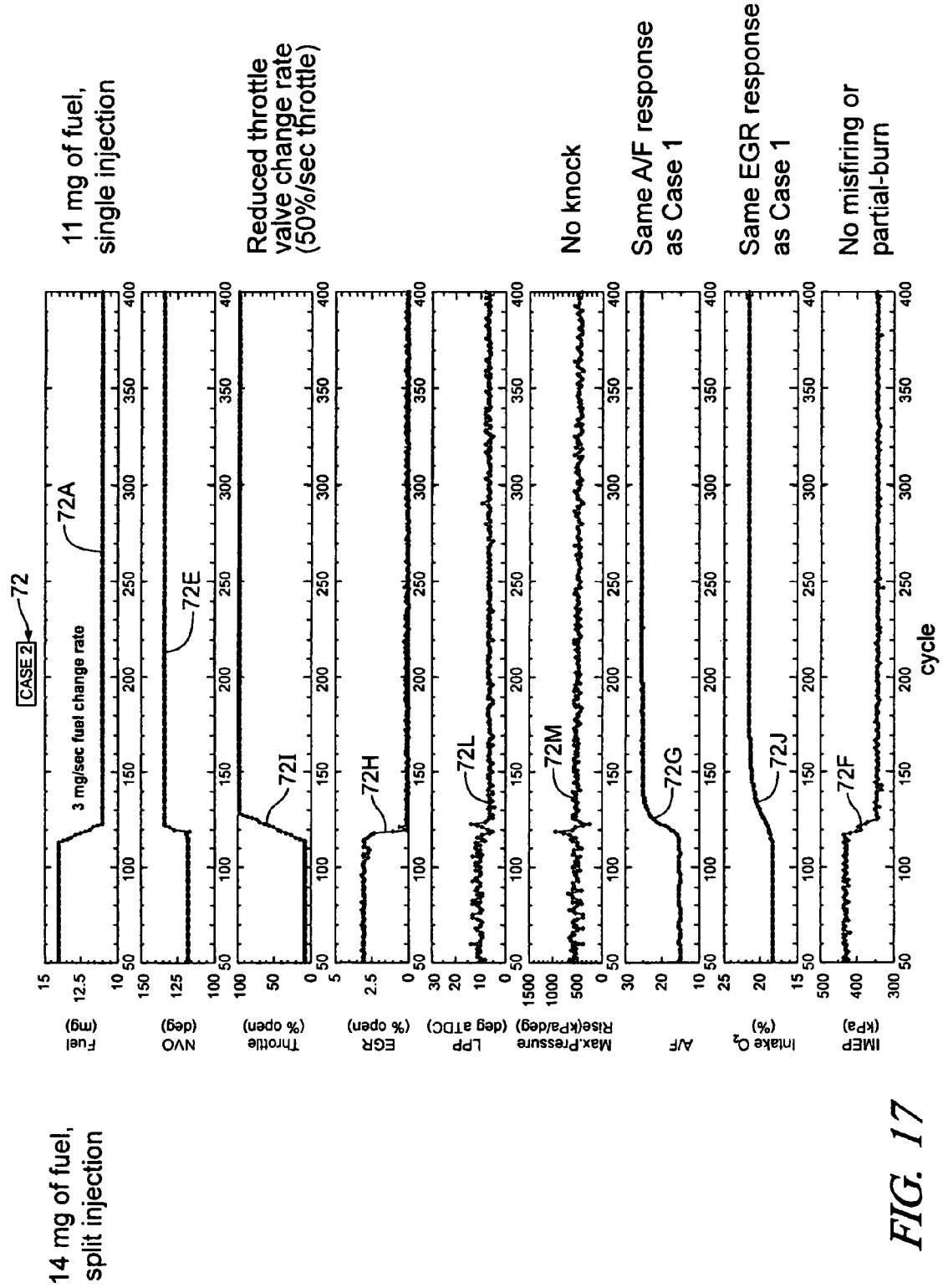
FIGS. 17-21 are graphs similar to FIG. 16 but showing the results of cases 2-6.
Figure 18:
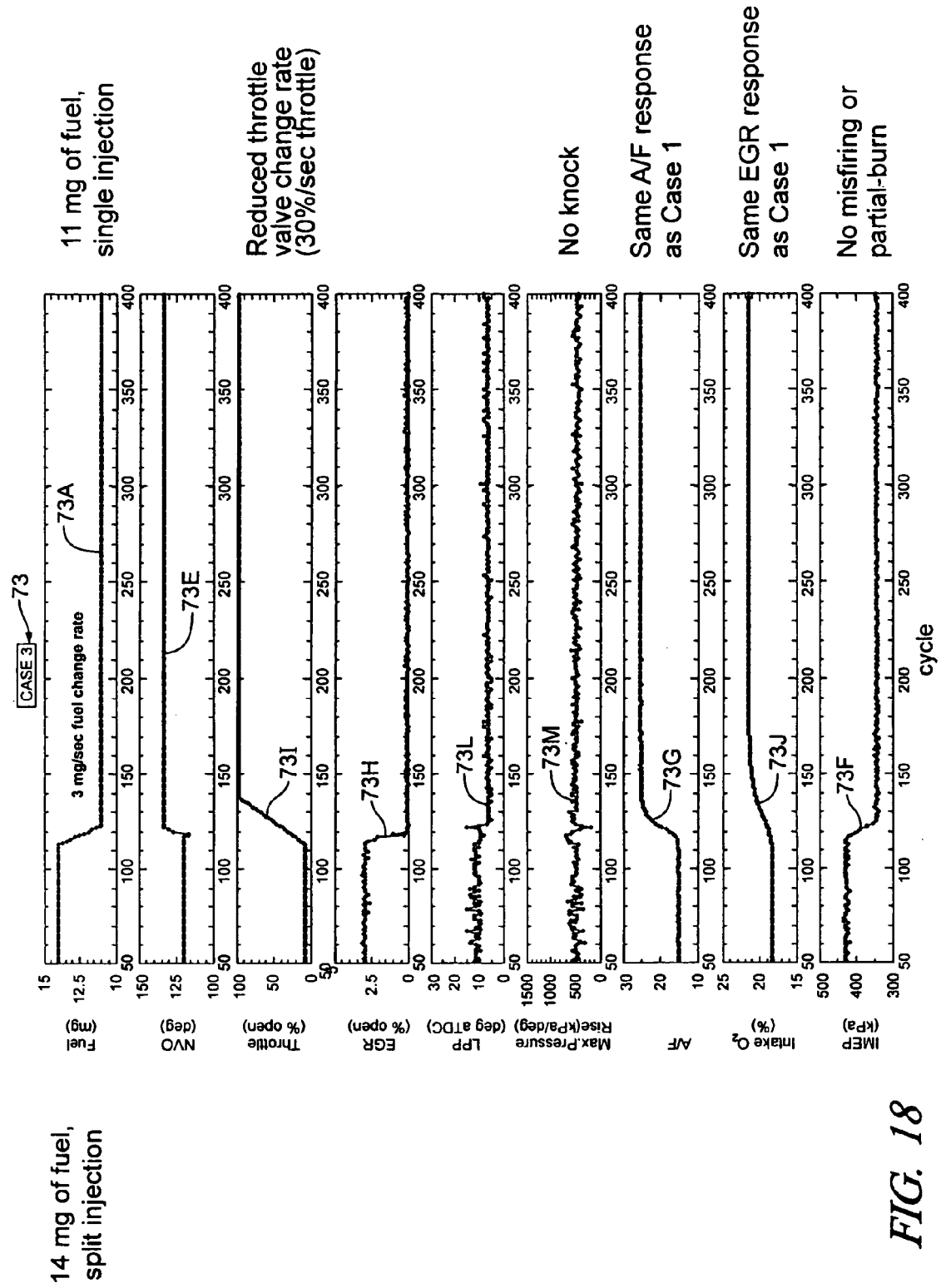
Figure 19:
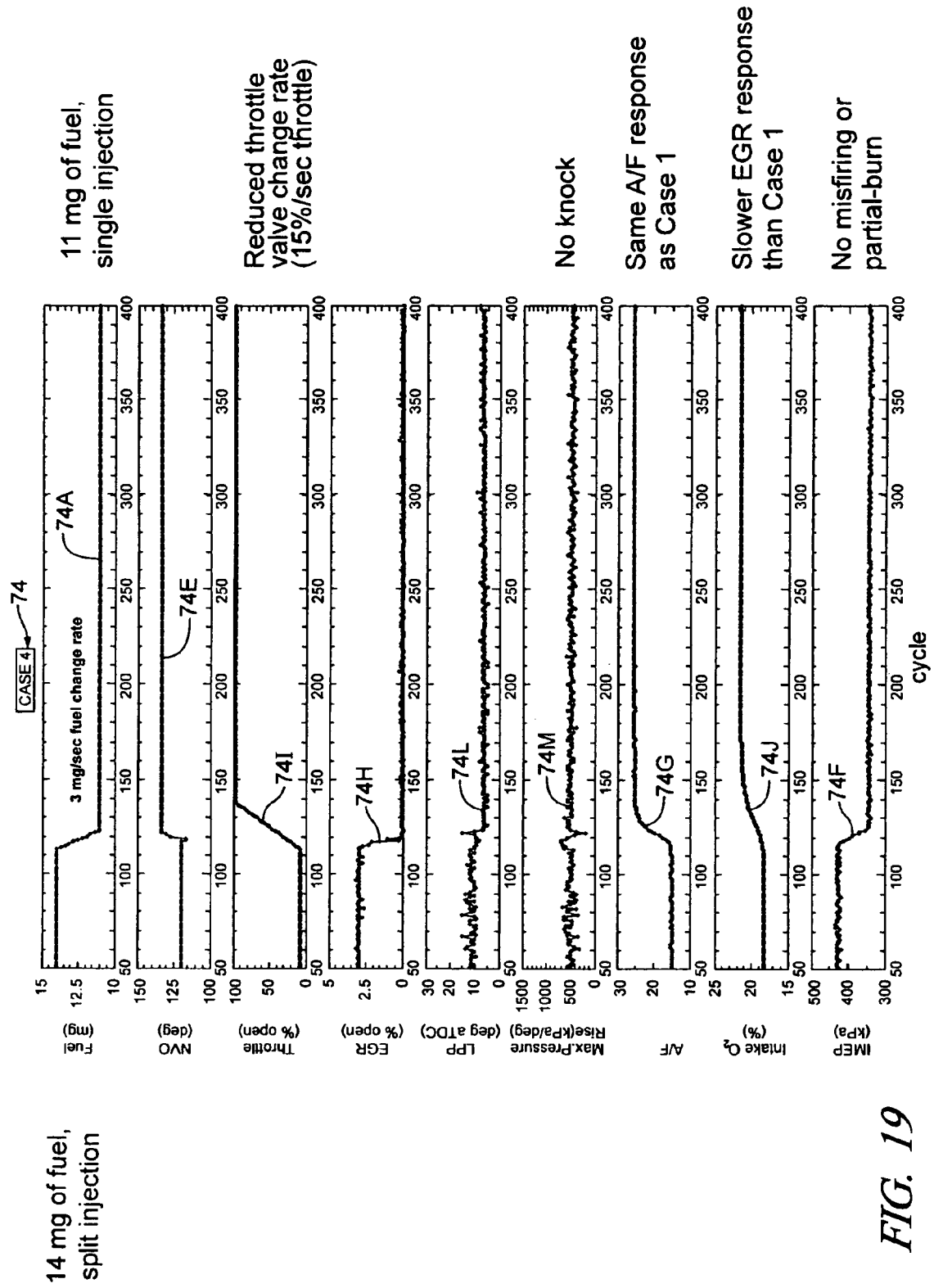
Figure 20:
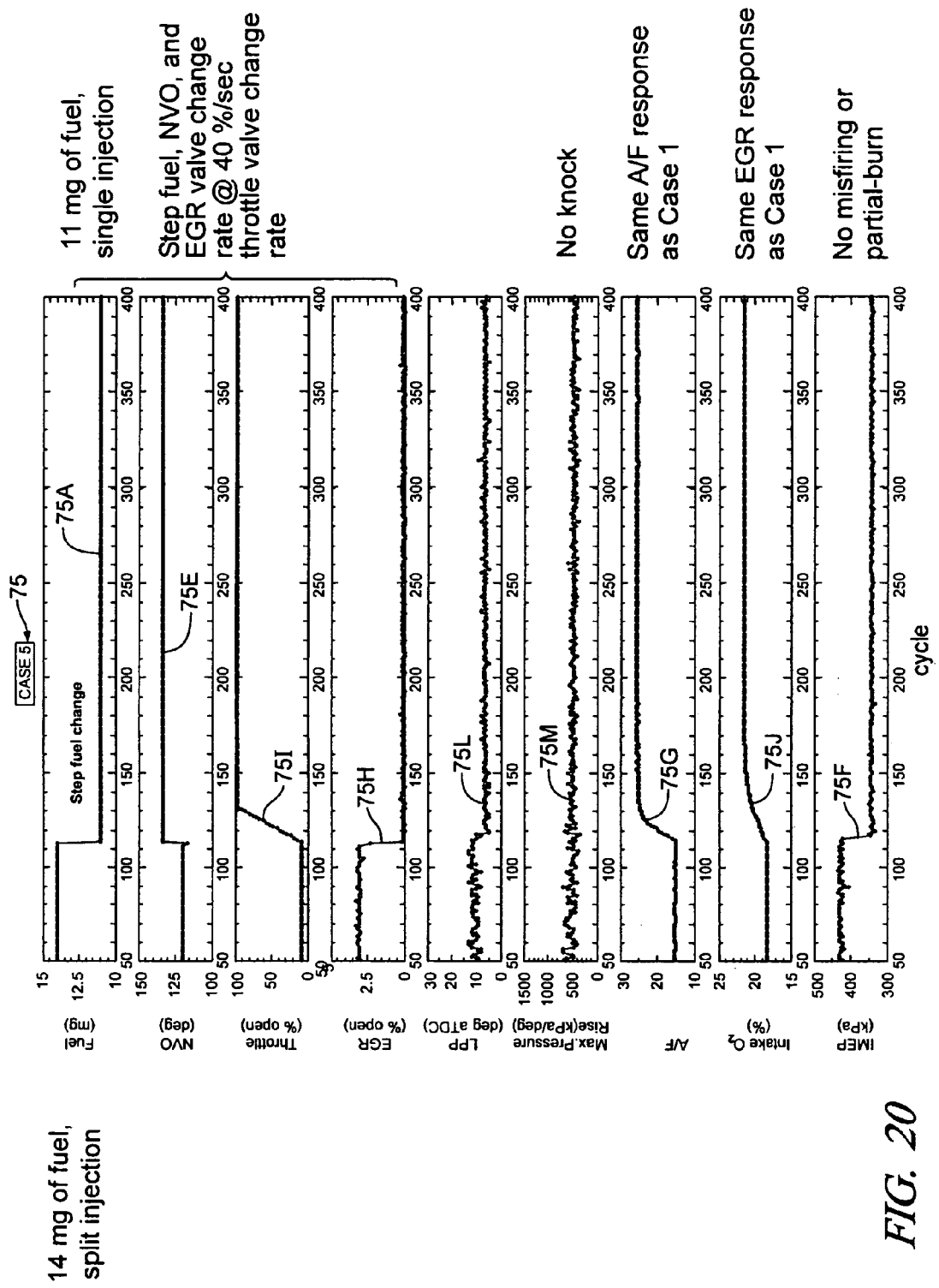
Figure 21:
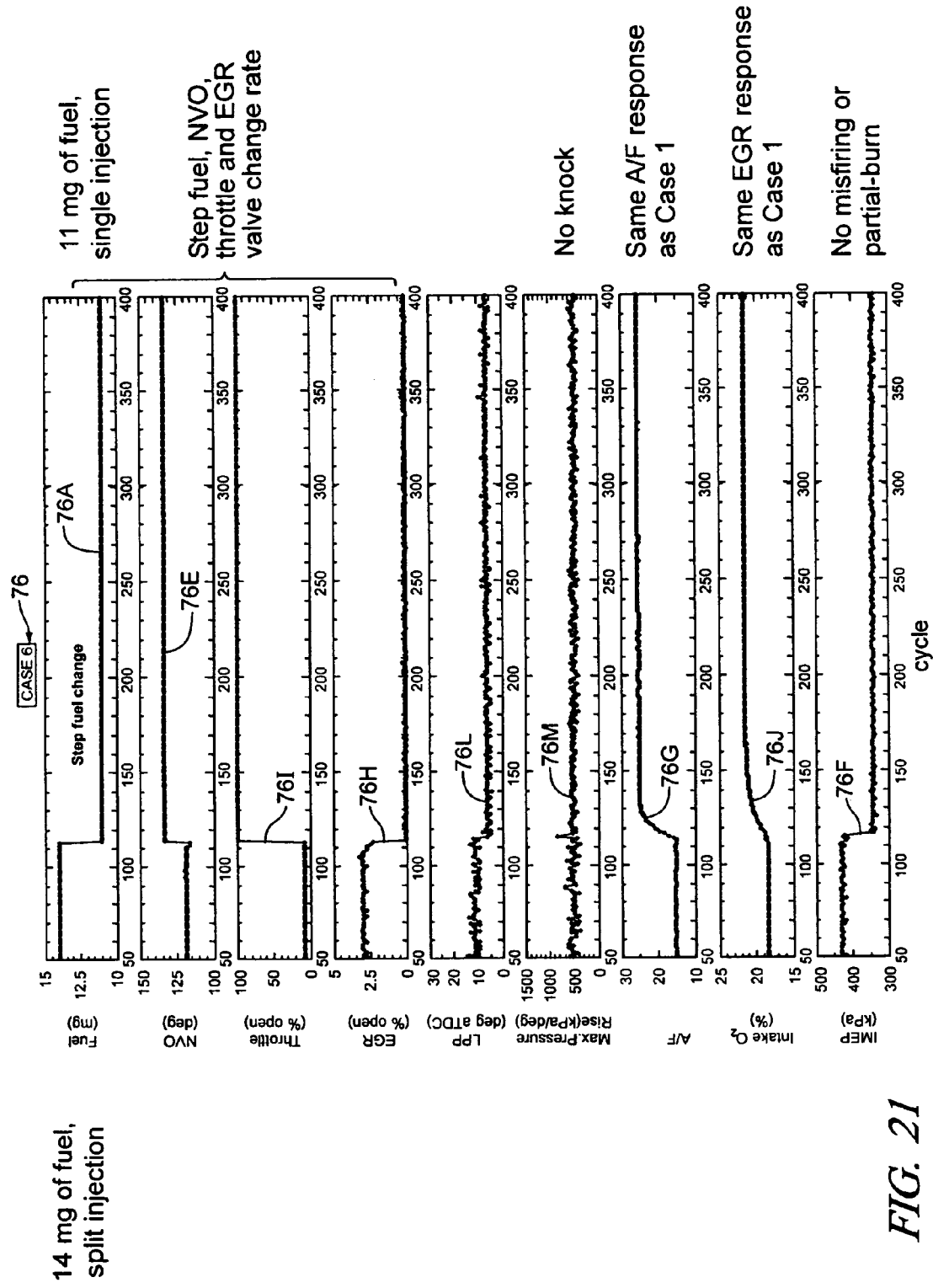
Figure 22:
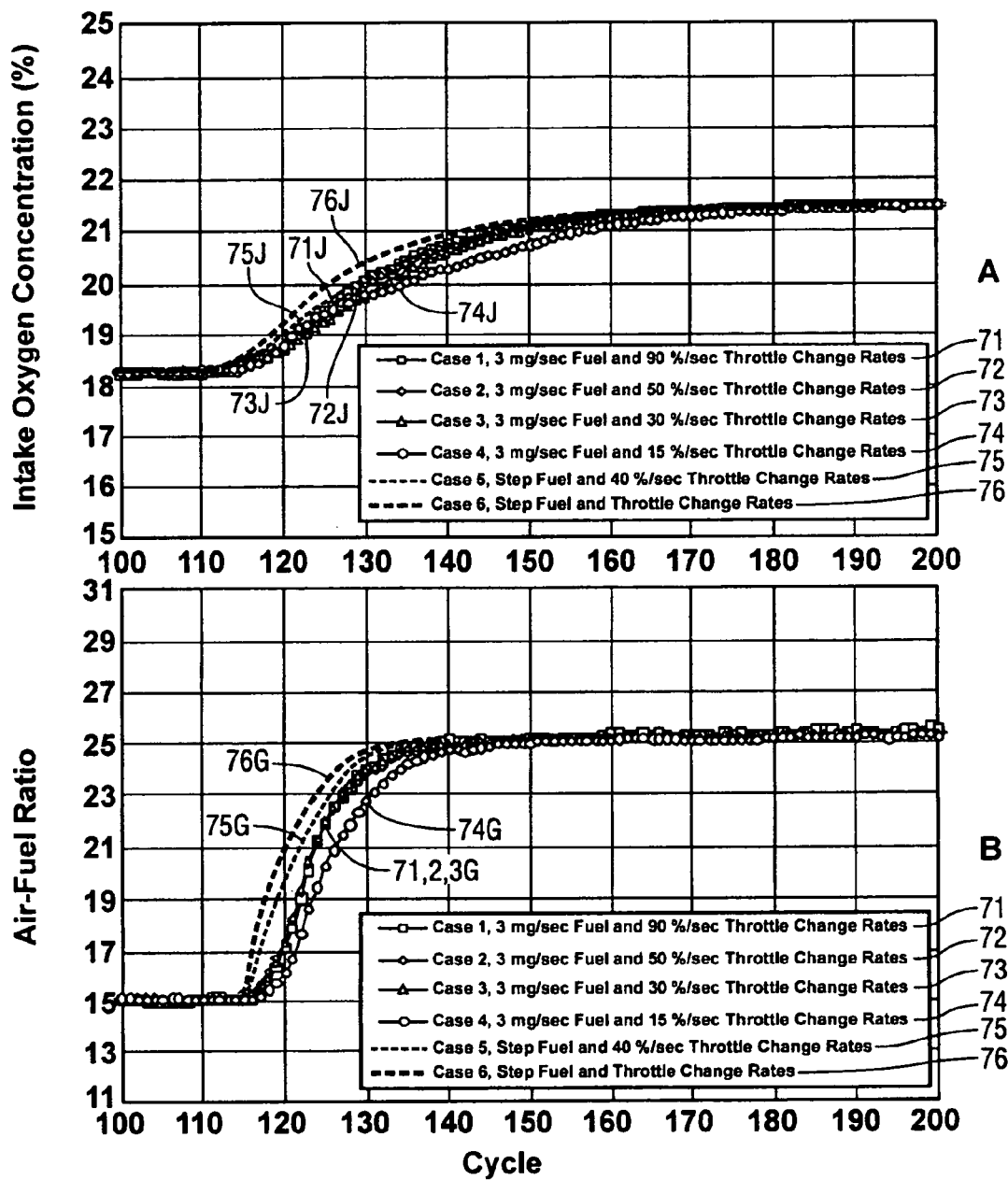
FIGS. 22A and B are composite graphs of measured percent intake $O_2$ and exhaust air-furl ratio for cases 1-6.

All results presented in FIGS. 9-15 are plotted in one composite graph for case 1 as shown in FIG. 16. Similar plots for cases 2 to 6 are shown in FIGS. 17-21. In particular, cases 1-4 show the effect of throttle change rate. The effect of fuel change rate is compared using results of cases 1, 4, 5, and 6.

Figure 23:
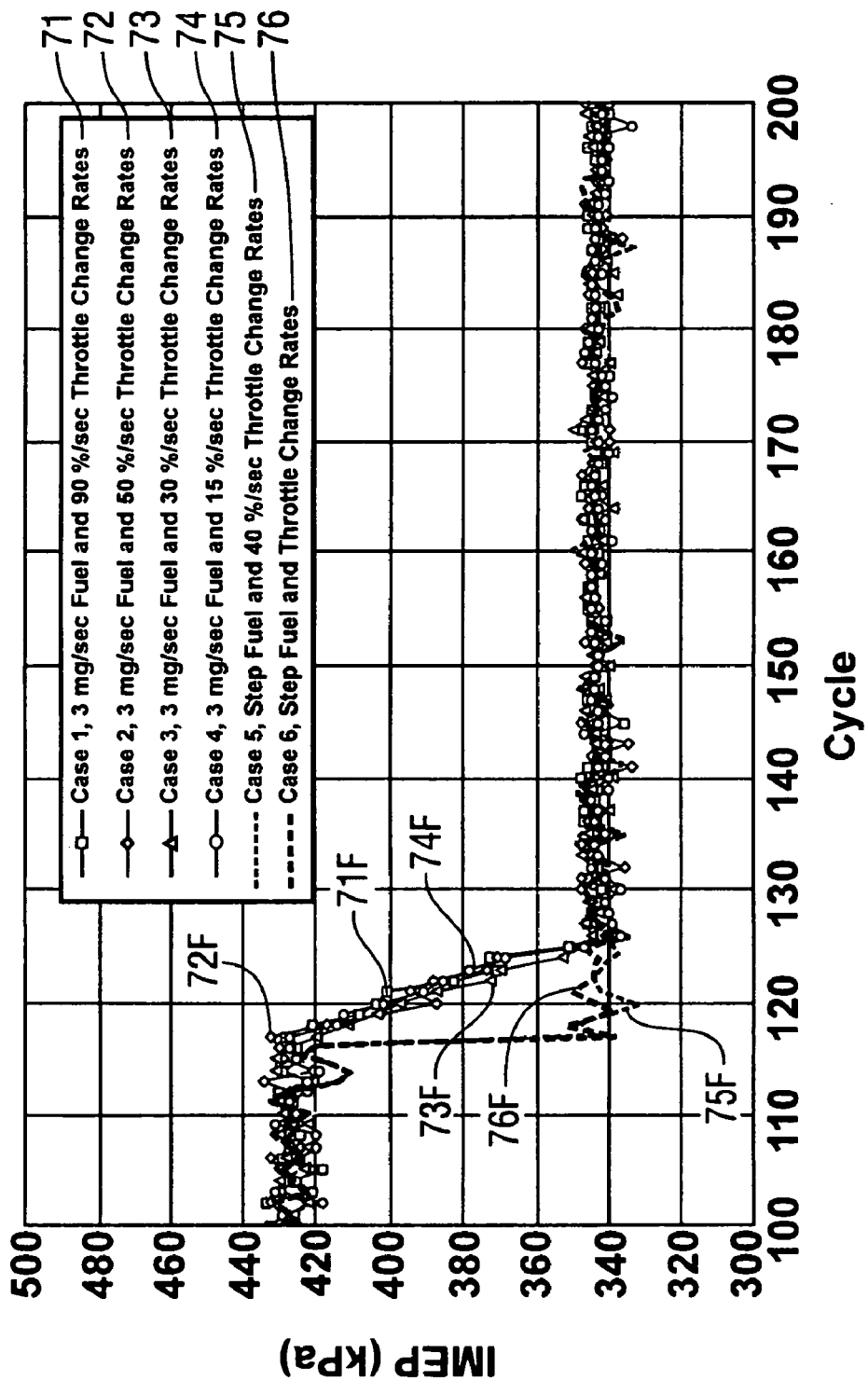
FIG. 23 is a composite graph of measured IMEP vs. engine cycles for cases 1-6.
Figure 24:
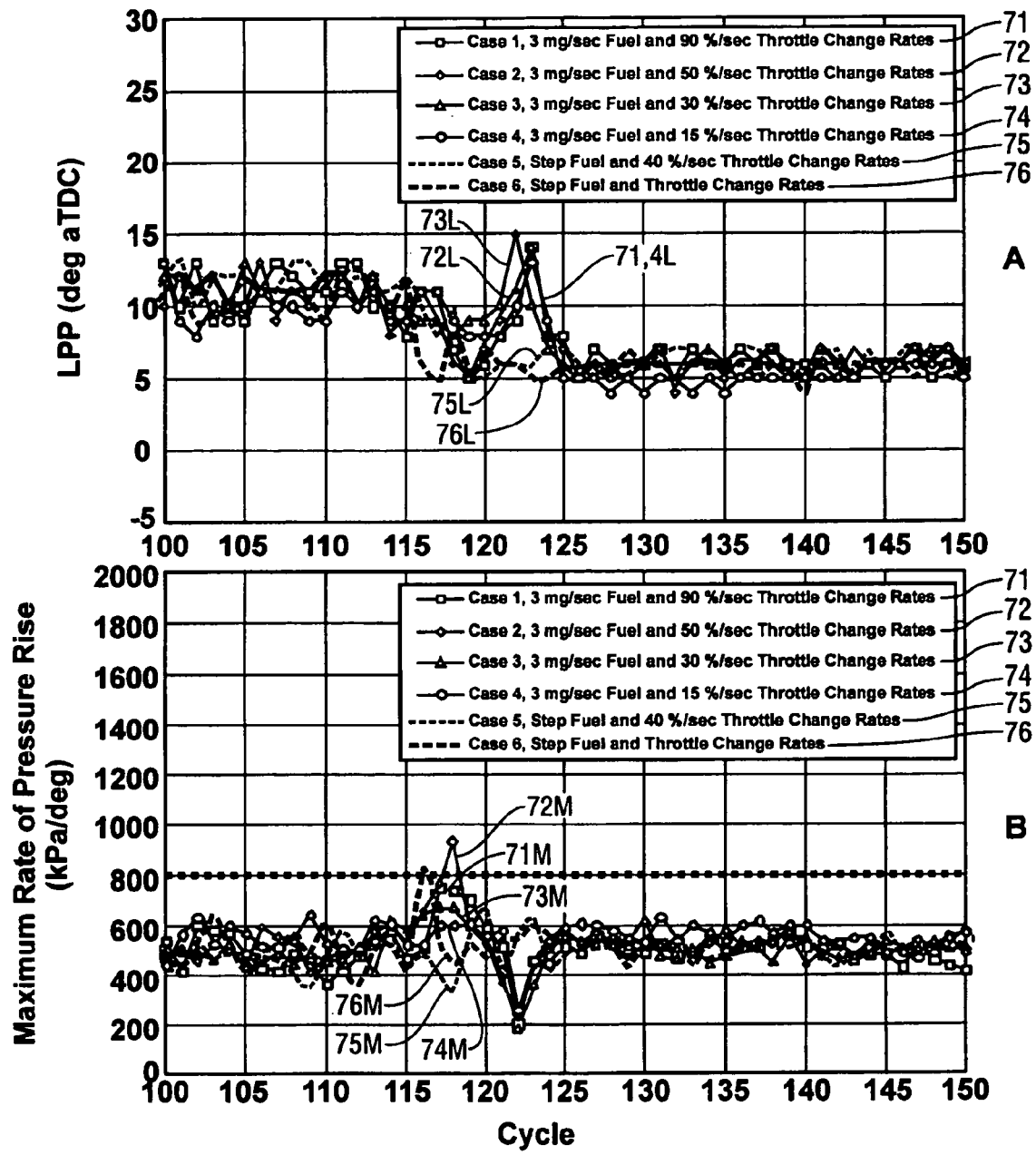
FIGS. 24A and B are graphs of LLP and maximum rate of pressure rise vs. engine cycles for cases 1-6.

Several observations were reached by comparing results shown in FIGS. 9 to 15. FIGS. 22A and 22B show measured intake oxygen concentration (lines 71J-76J) and exhaust air-fuel ratio (lines 71G-76G), respectively, of cases 1 to 6 for load transition from 14 to 11 mg/cycle. It is clear from both figures that the characteristic times of transition for intake oxygen concentration and exhaust air-fuel ratio are substantially insensitive to throttle and fuel change rates. As a result, the measured IMEP is only a function of fuel input as shown in FIG. 23 (lines 71F-76F) and is insensitive to throttle change rate. Further, for all 6 cases examined, there is no misfiring or partial-burn observed during the load transition.

FIGS. 24A lines and 24B show measured LPP (71L-76L) and maximum rate of pressure rise (71M-76M), respectively, of cases 1 to 6 for load transition from 14 to 11 mg/cycle. It is clear from FIG. 24B that the maximum rate of pressure rise during main combustion is kept below the threshold value of 800 kPa/deg for all 6 cases examined.

Figure 25:
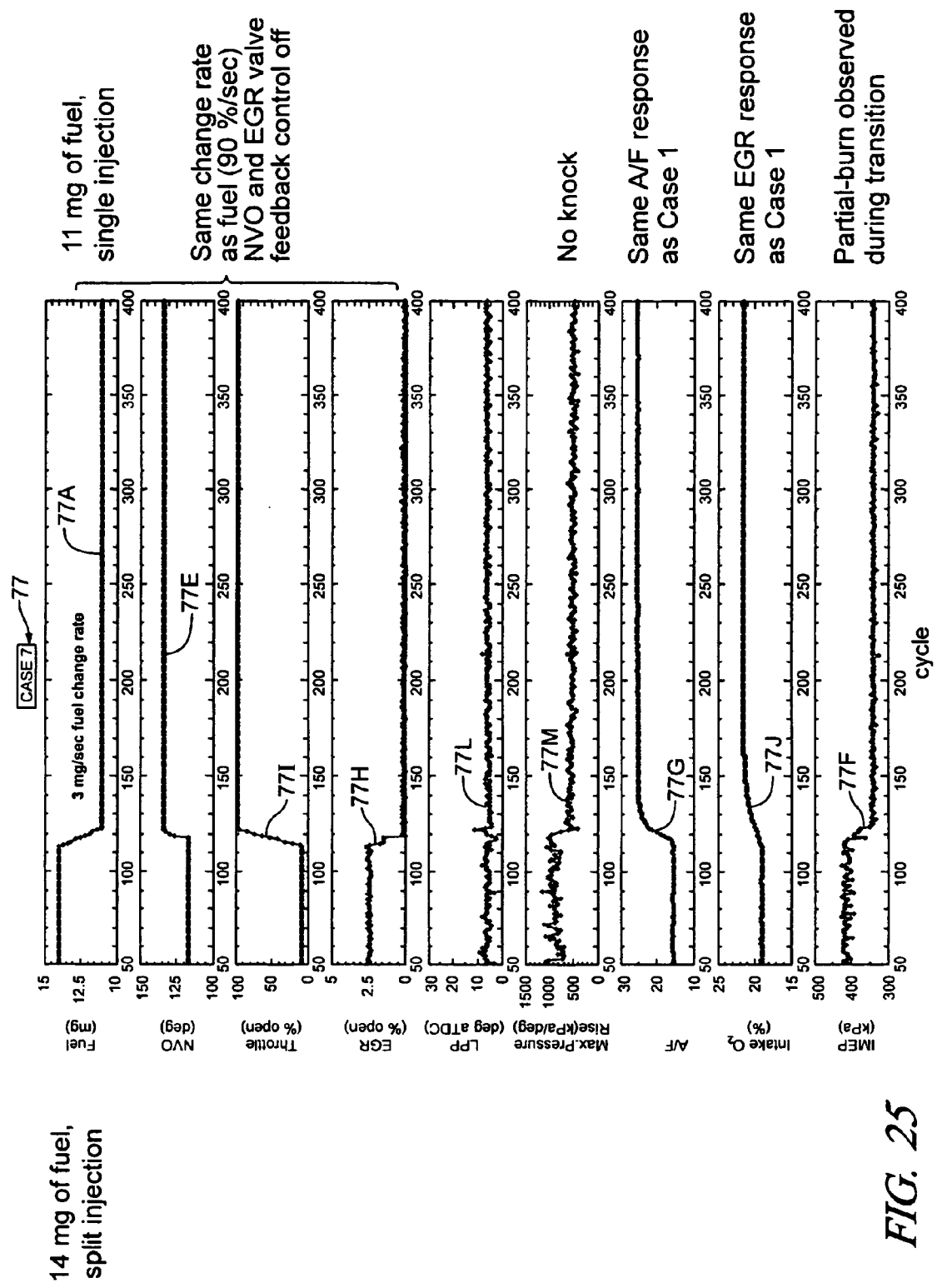
FIG. 25 is a composite graph of case 7 showing the various engine inputs.
Figure 26:
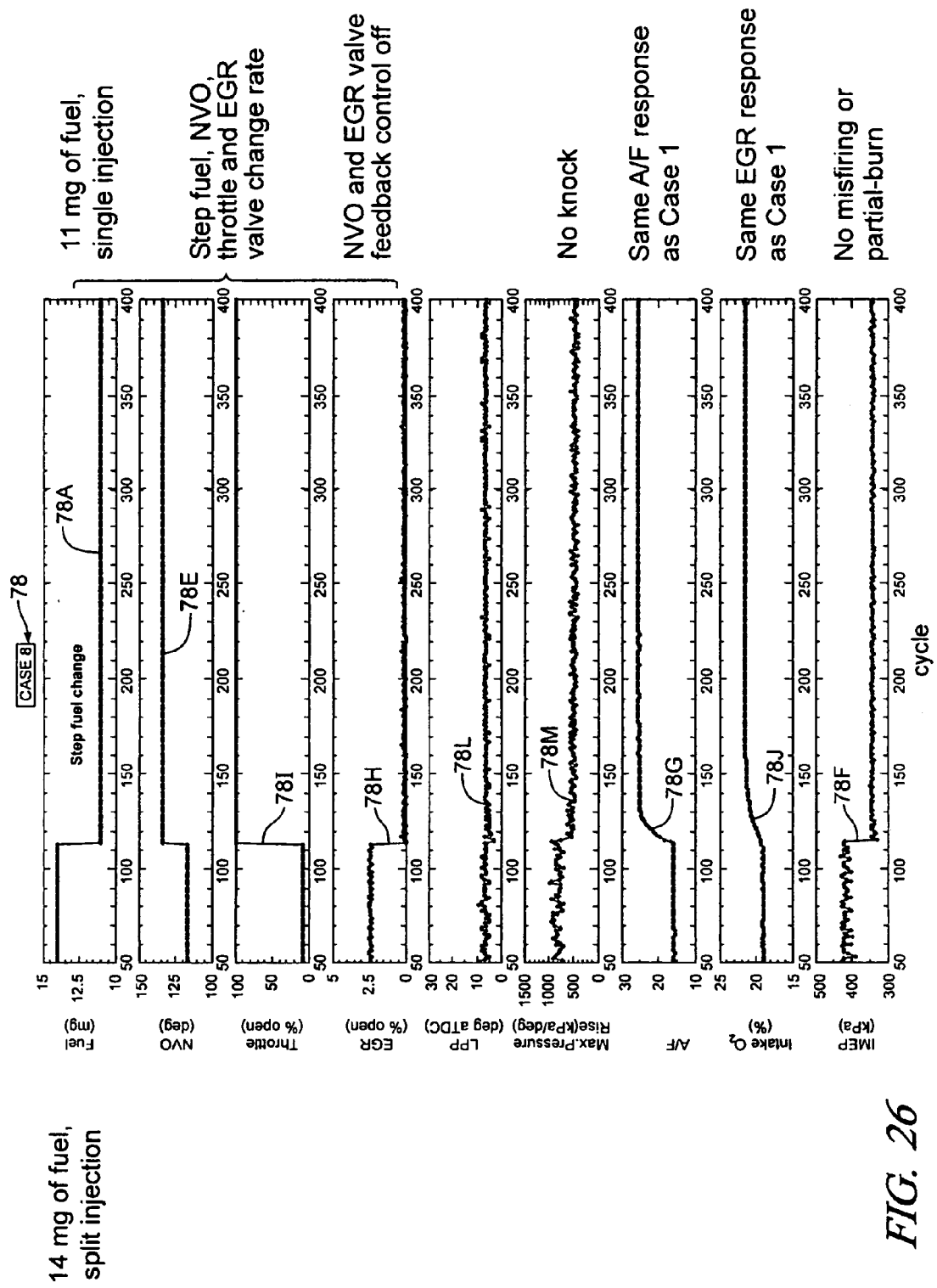
FIG. 26 is a composite graph of case 8 showing the various engine inputs.
Figure 27:
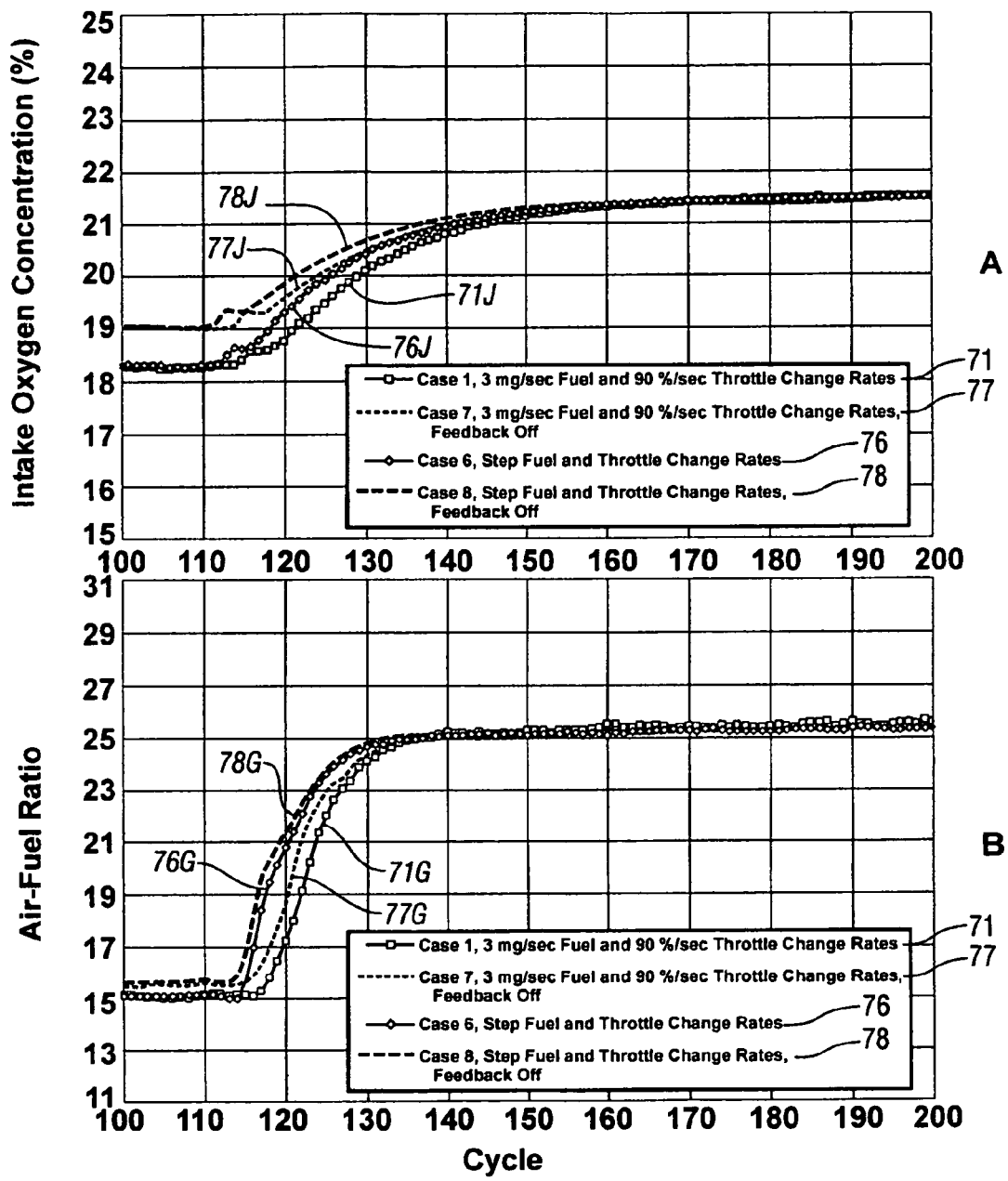
FIGS. 27A and B are graphs of measured percent intake $O_2$ and exhaust air-fuel ratio for cases 1, 6, 7 and 8.
Figure 28:
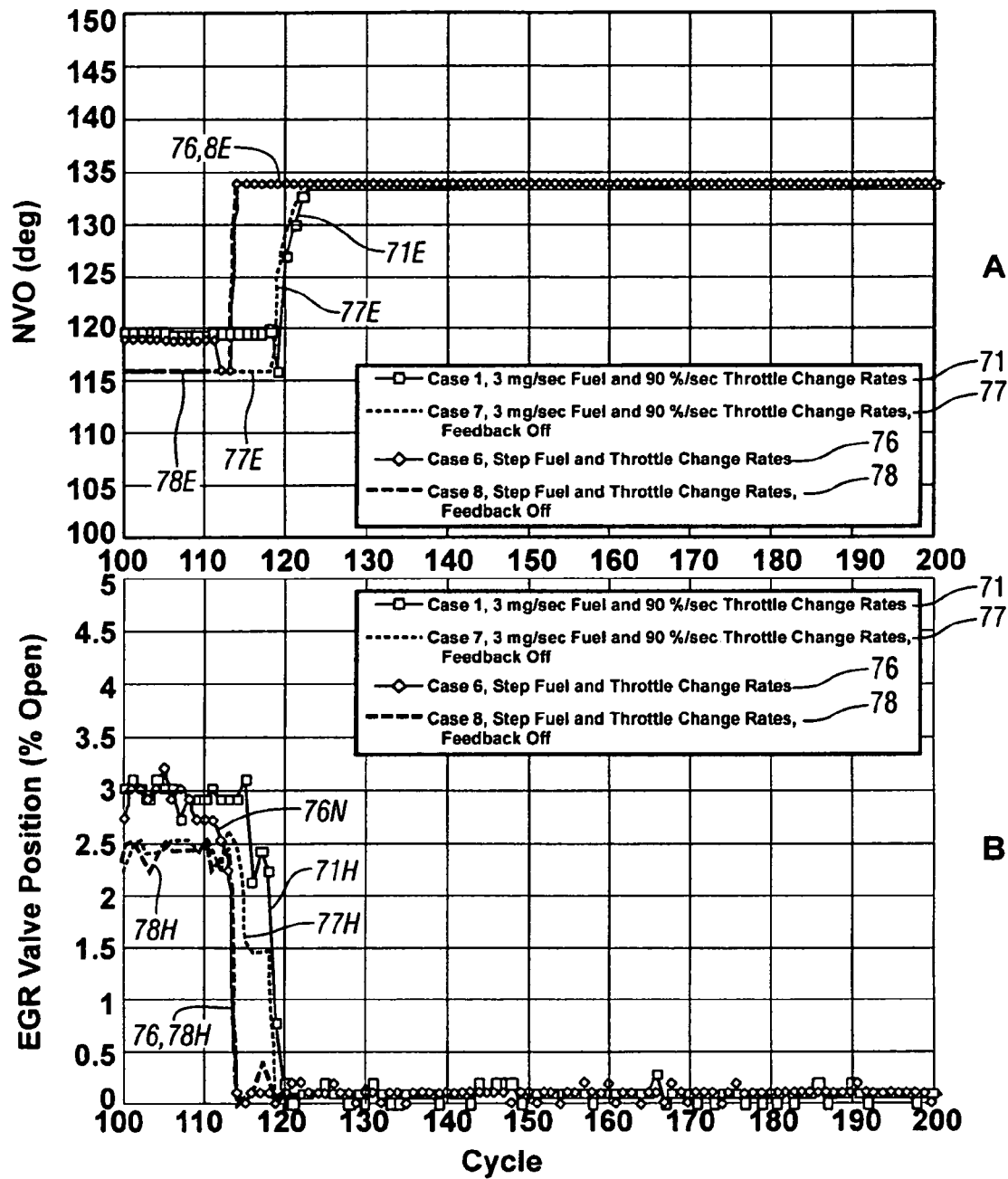
FIGS. 28A and B are graphs of actual NVO and EGR valve positions for cases 1, 6, 7 and 8.
Figure 29:
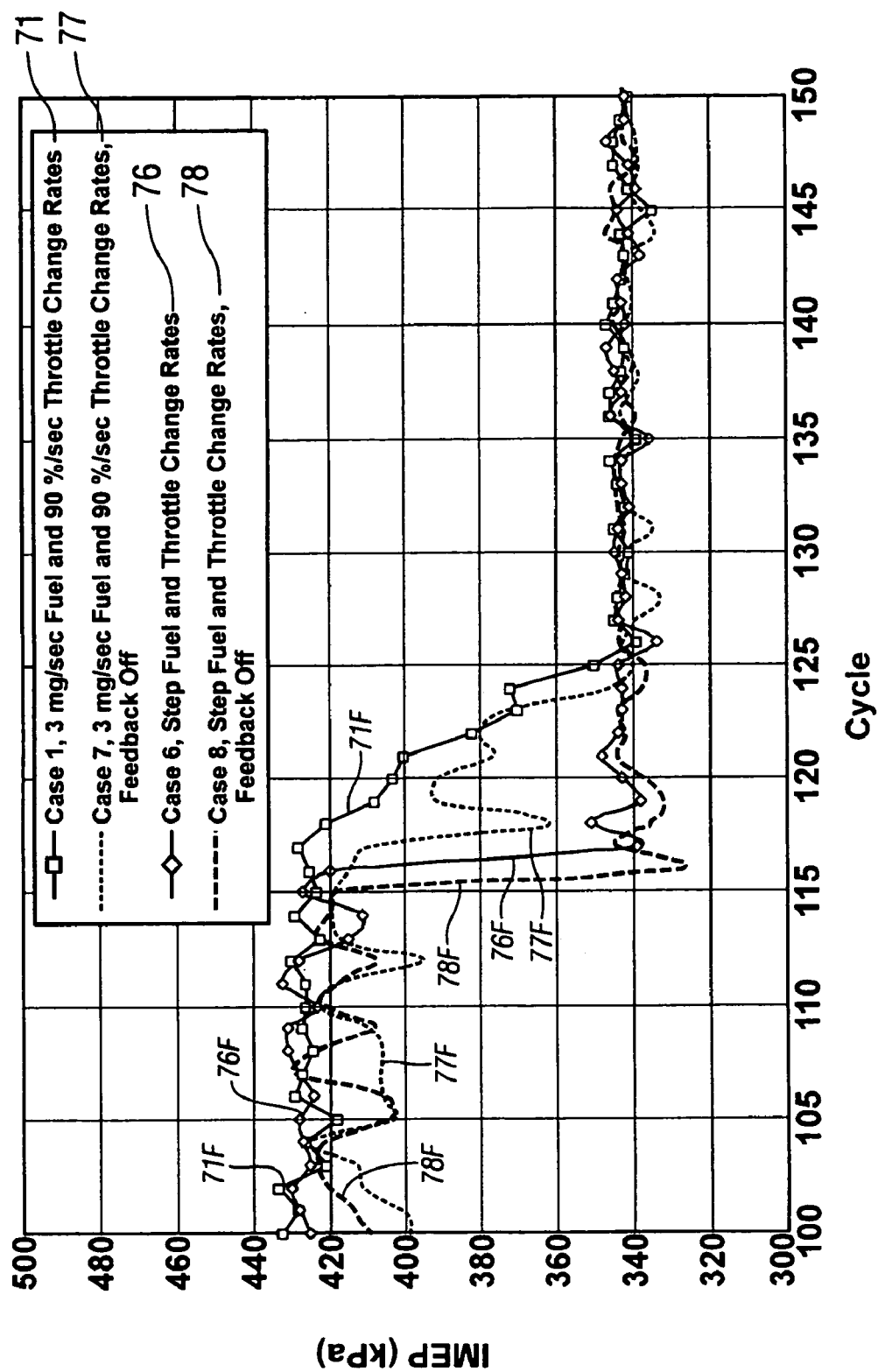
FIG. 29 is a composite graph of measured IMEP vs. engine cycles for cases 1, 6, 7 and 8.
Figure 30:
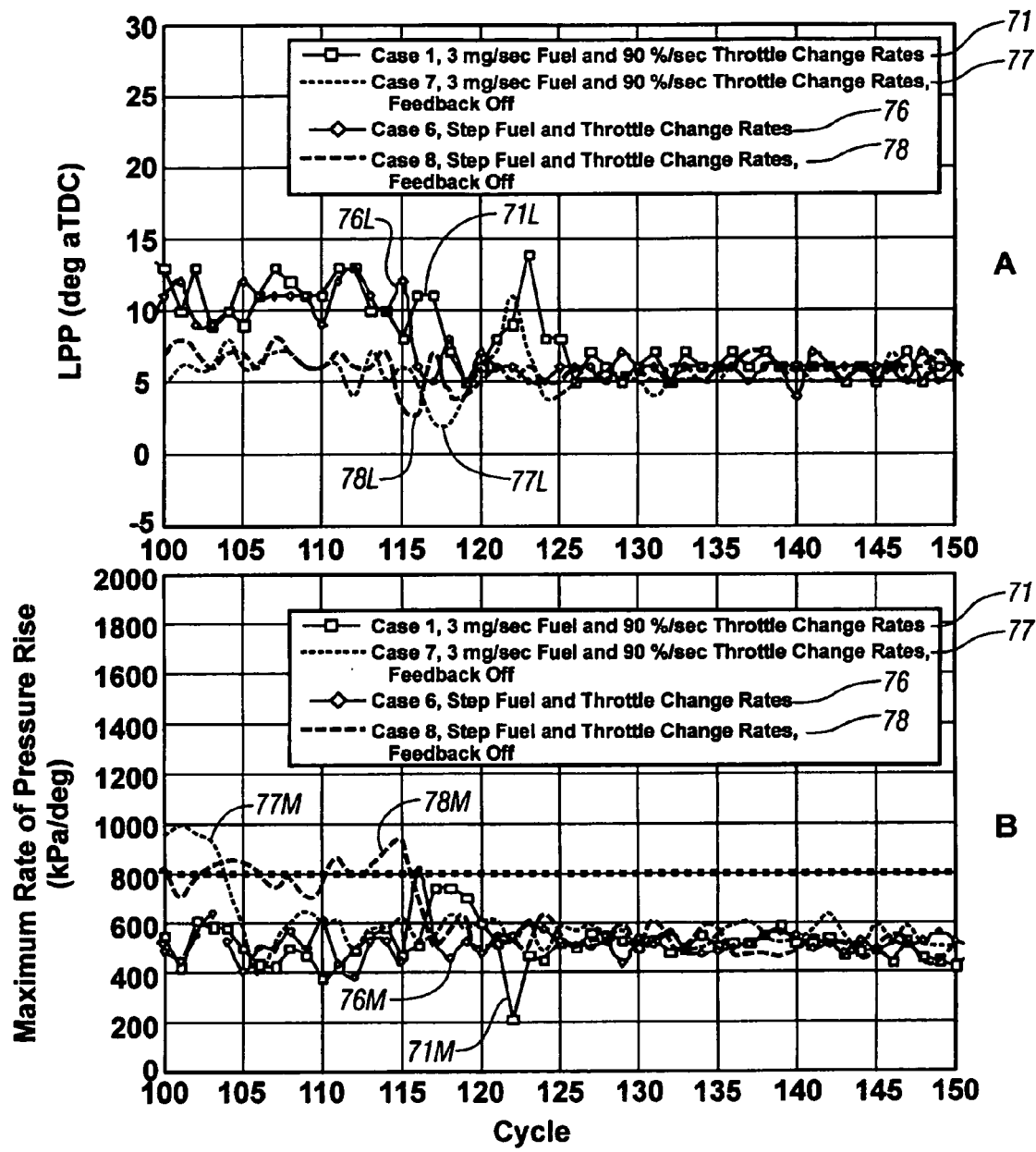
FIGS. 30A and B are graphs of measured LPP and maximum rate of pressure rise for cases 1, 6, 7 and 8.
Figure 31:
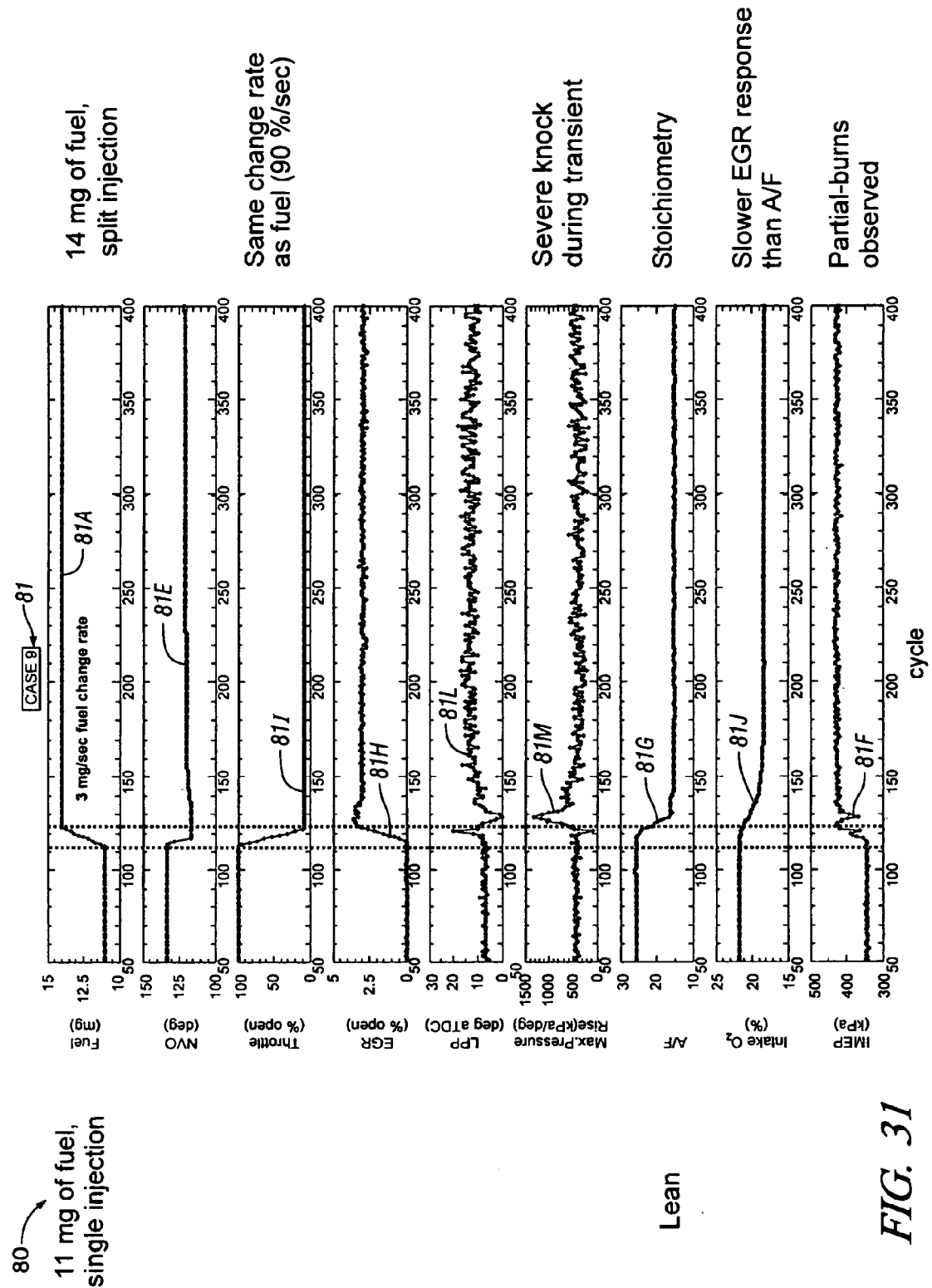
FIGS. 31-36 are composite graphs of the engine inputs for cases 9-14.
Figure 32:
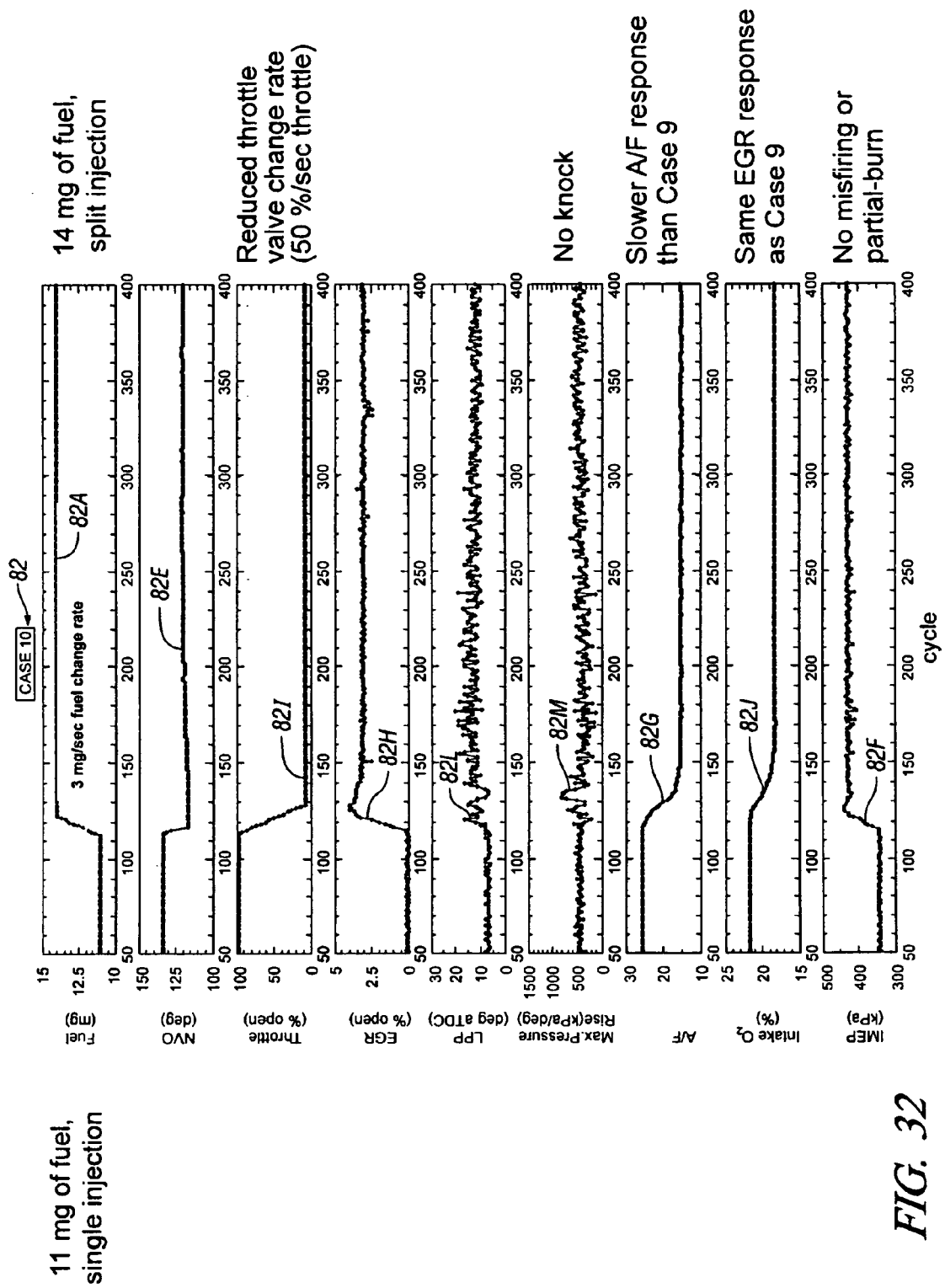
Figure 33:
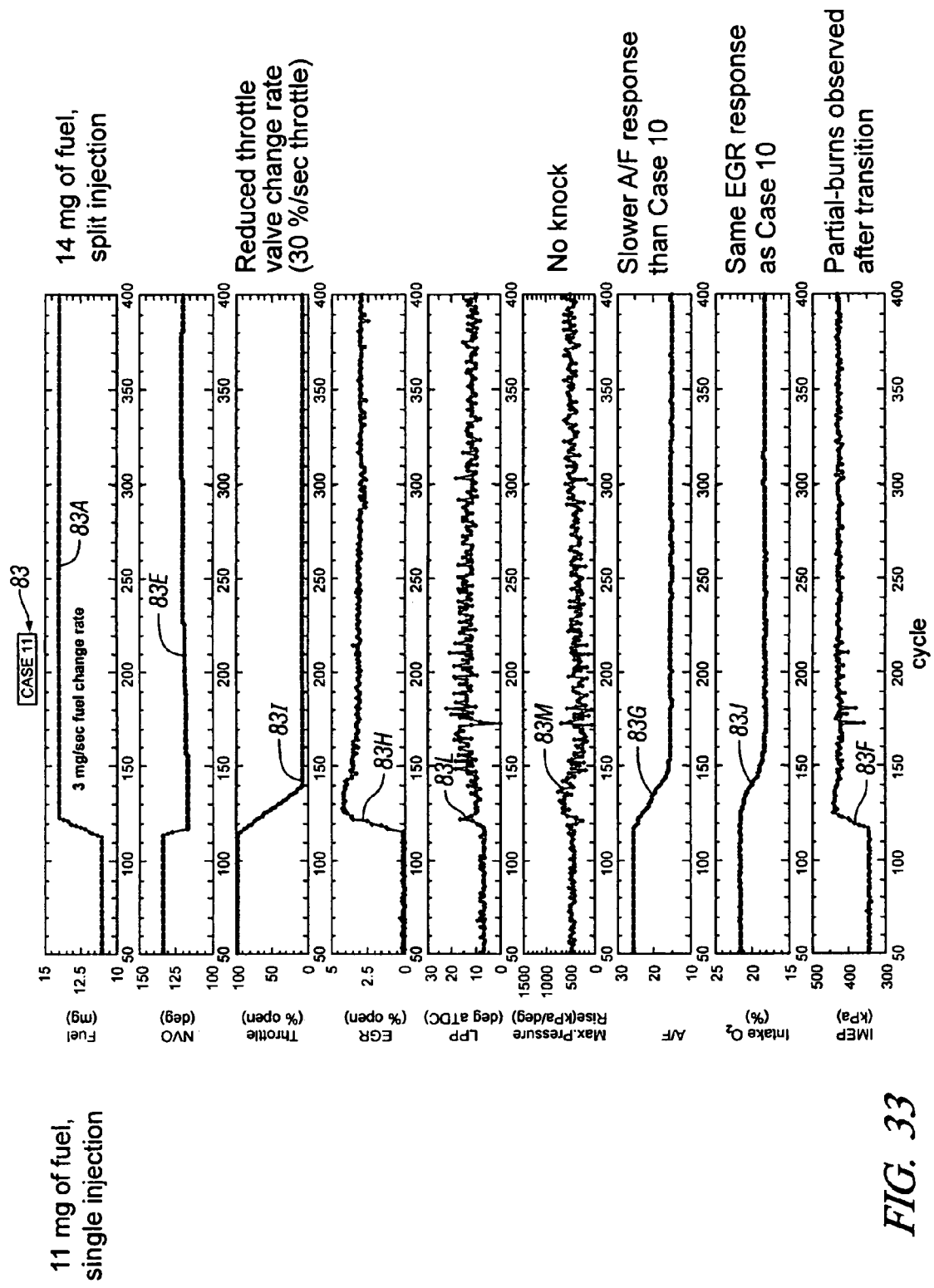
Figure 34:
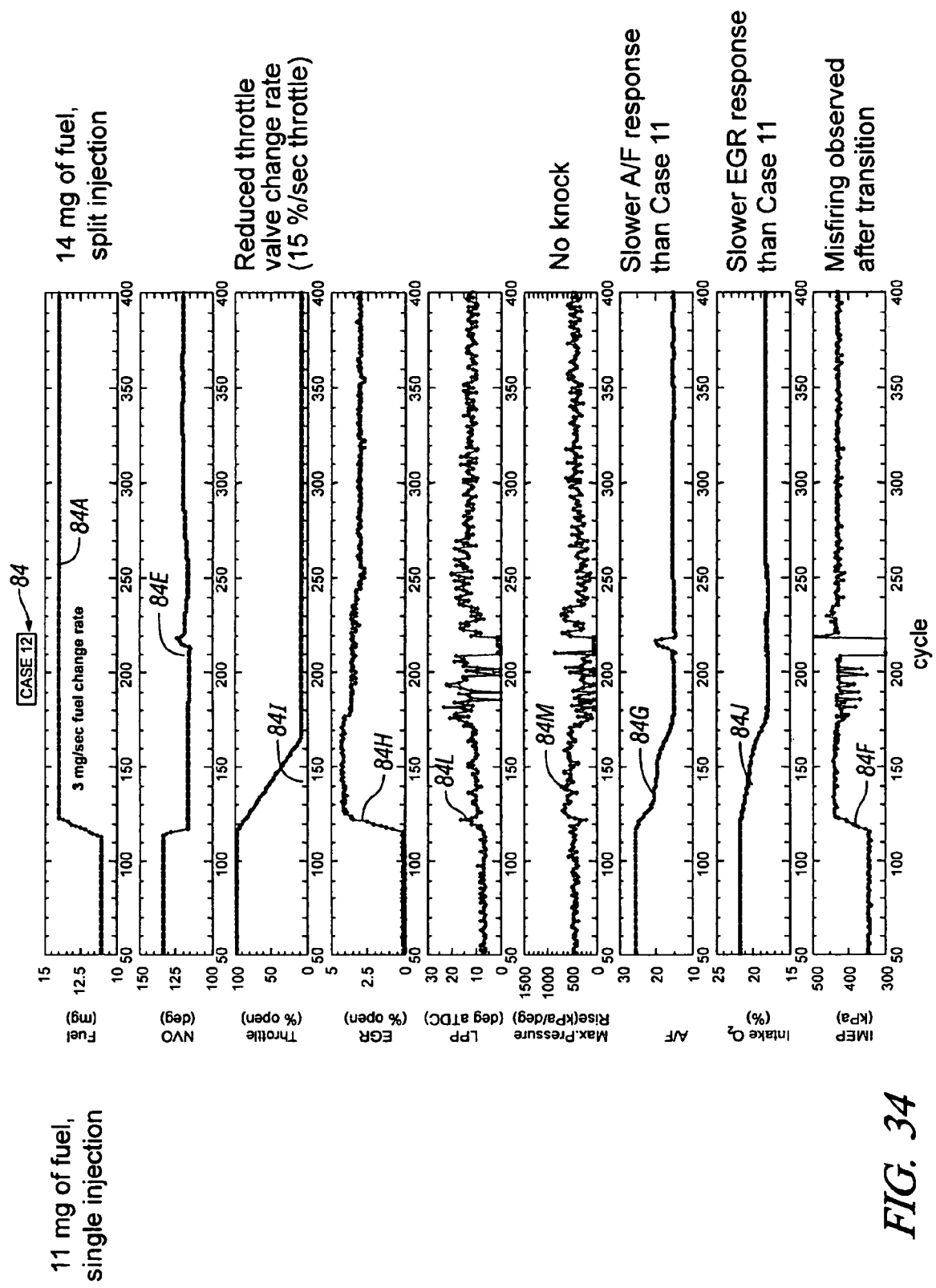
Figure 35:
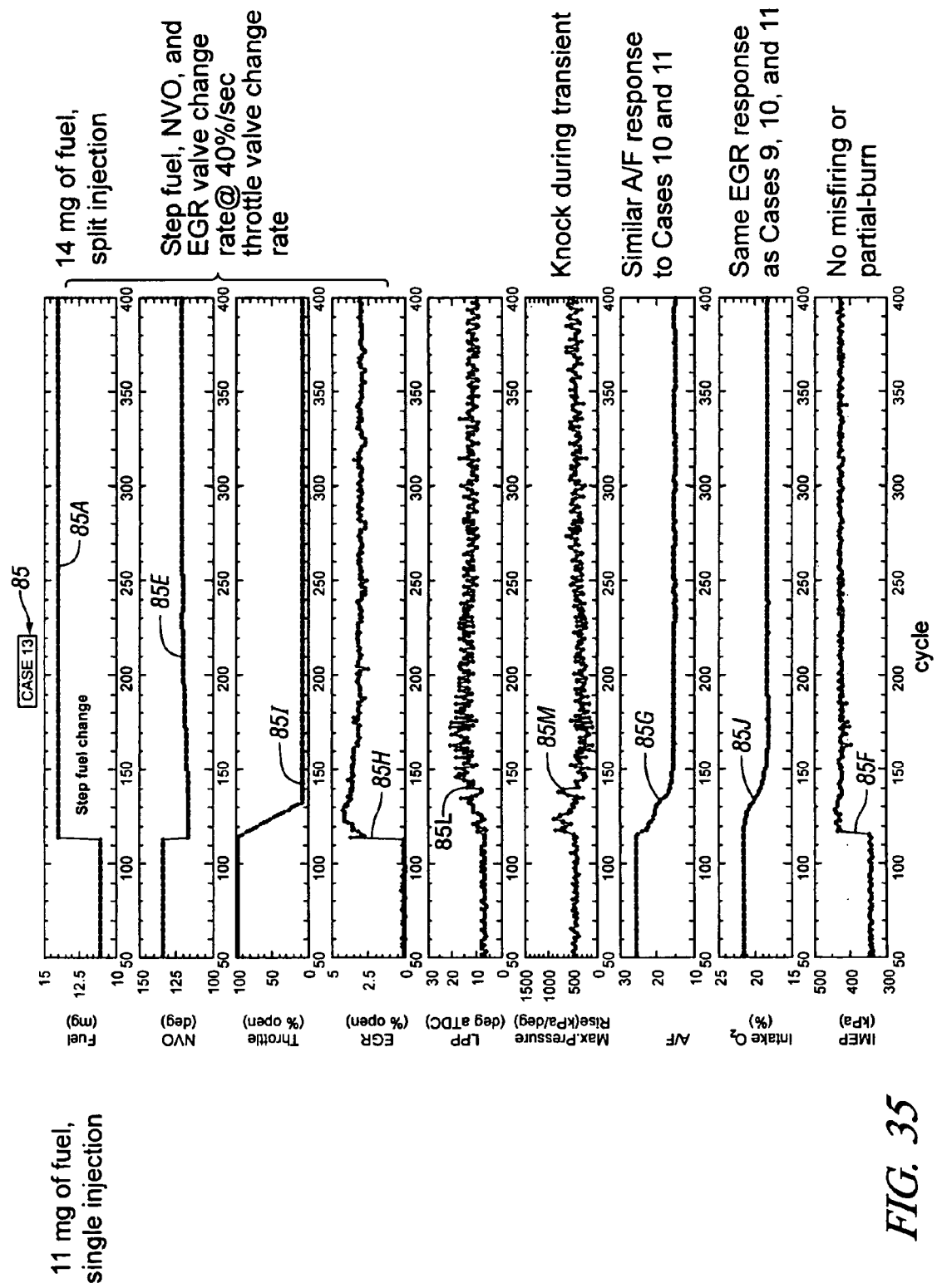
Figure 36:
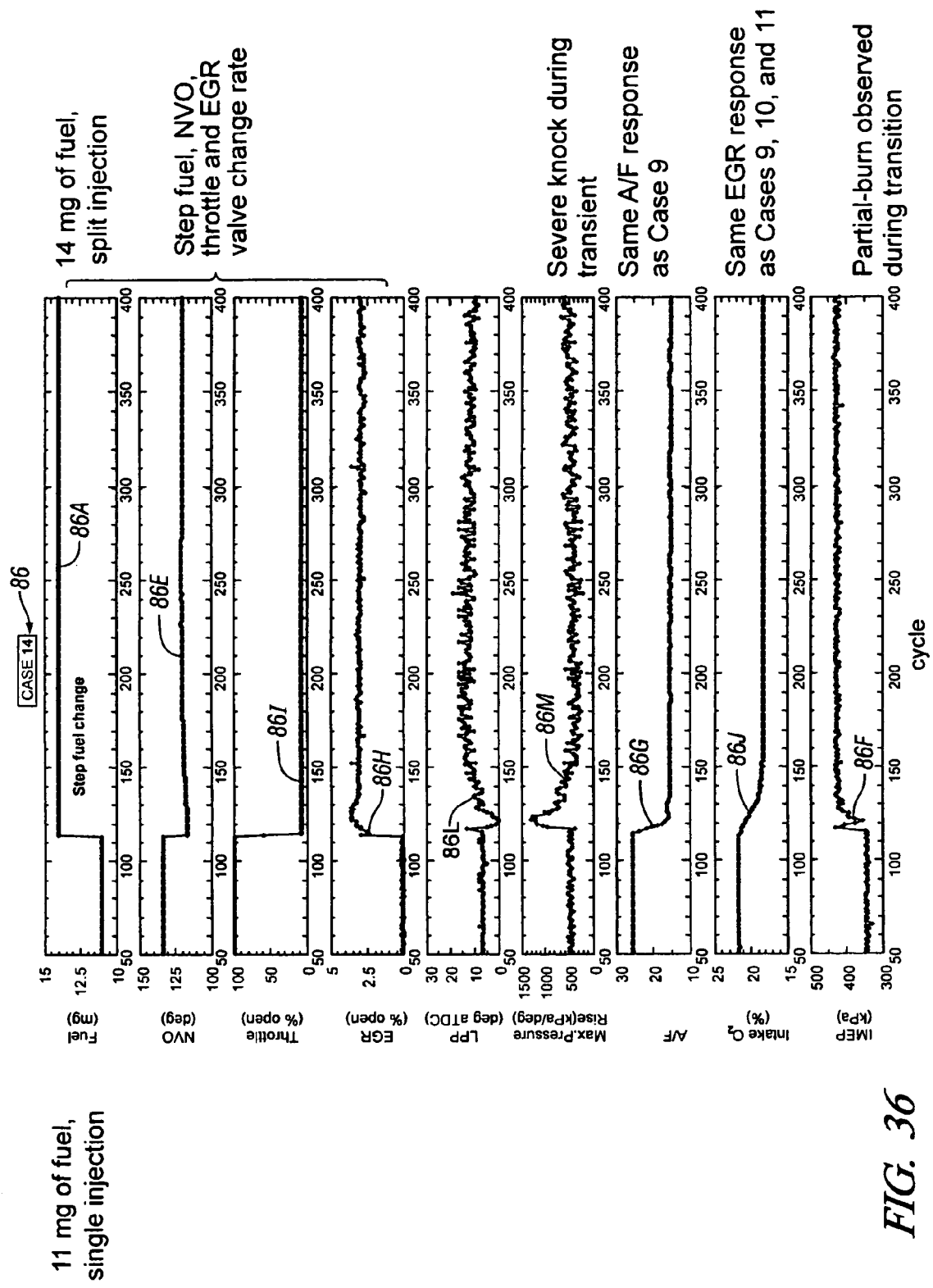
Figure 37:
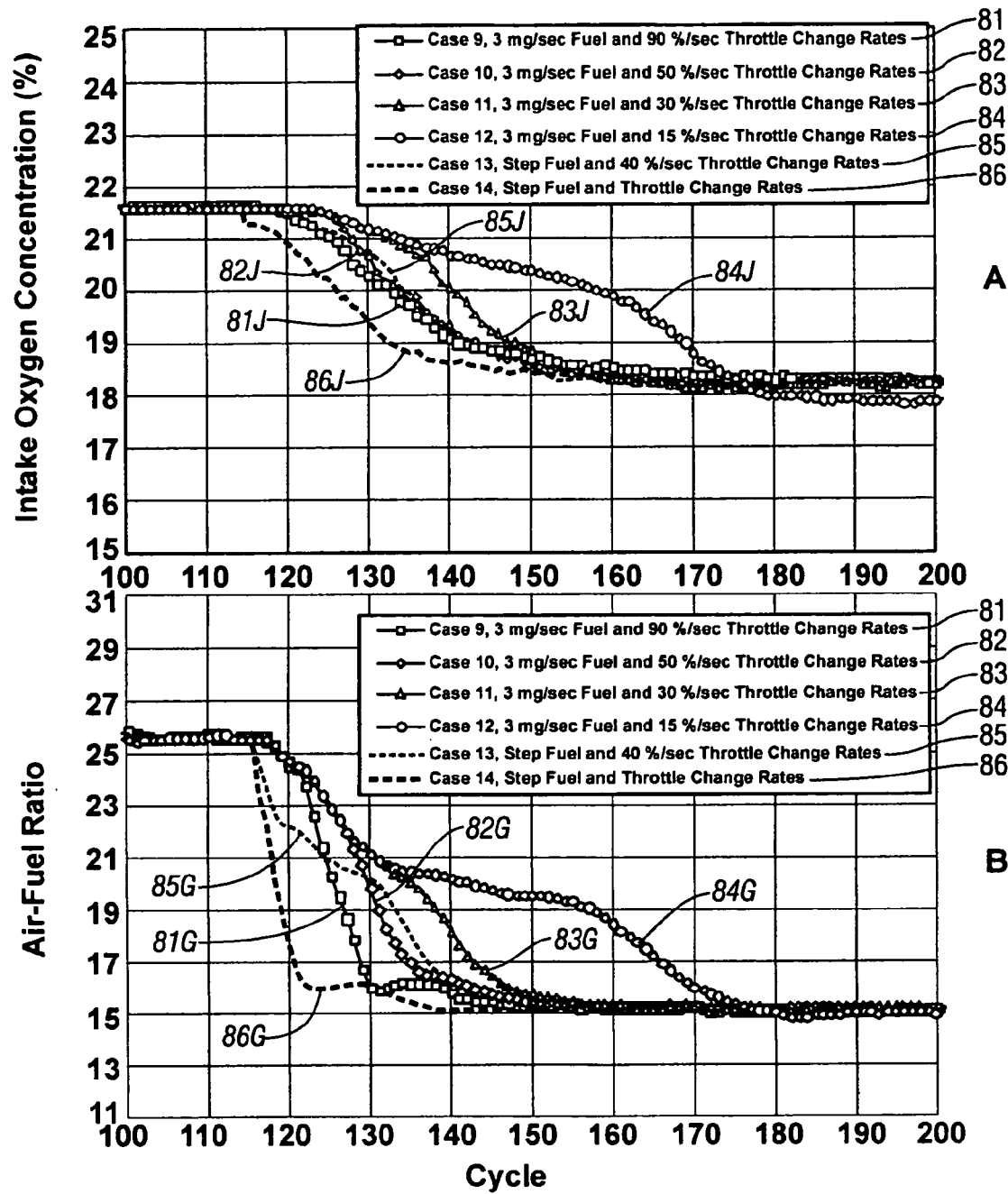
FIGS. 37A and B are graphs of measured percent intake $O_2$ and exhaust air-fuel ratio for cases 9-14.
Figure 38:
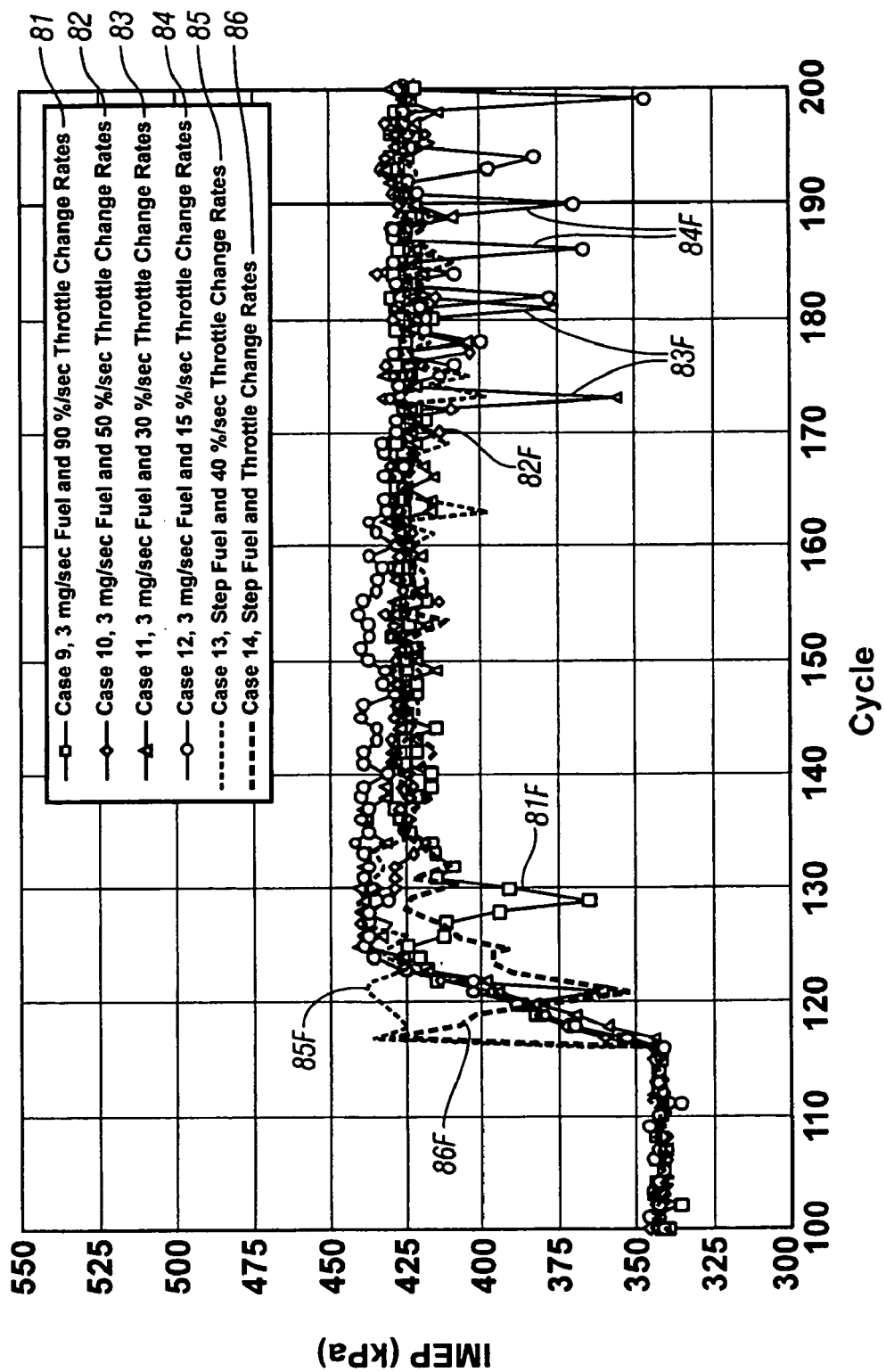
FIG. 38 is a composite graph of measured IMEP vs engine cycles for cases 9-14.
Figure 39:
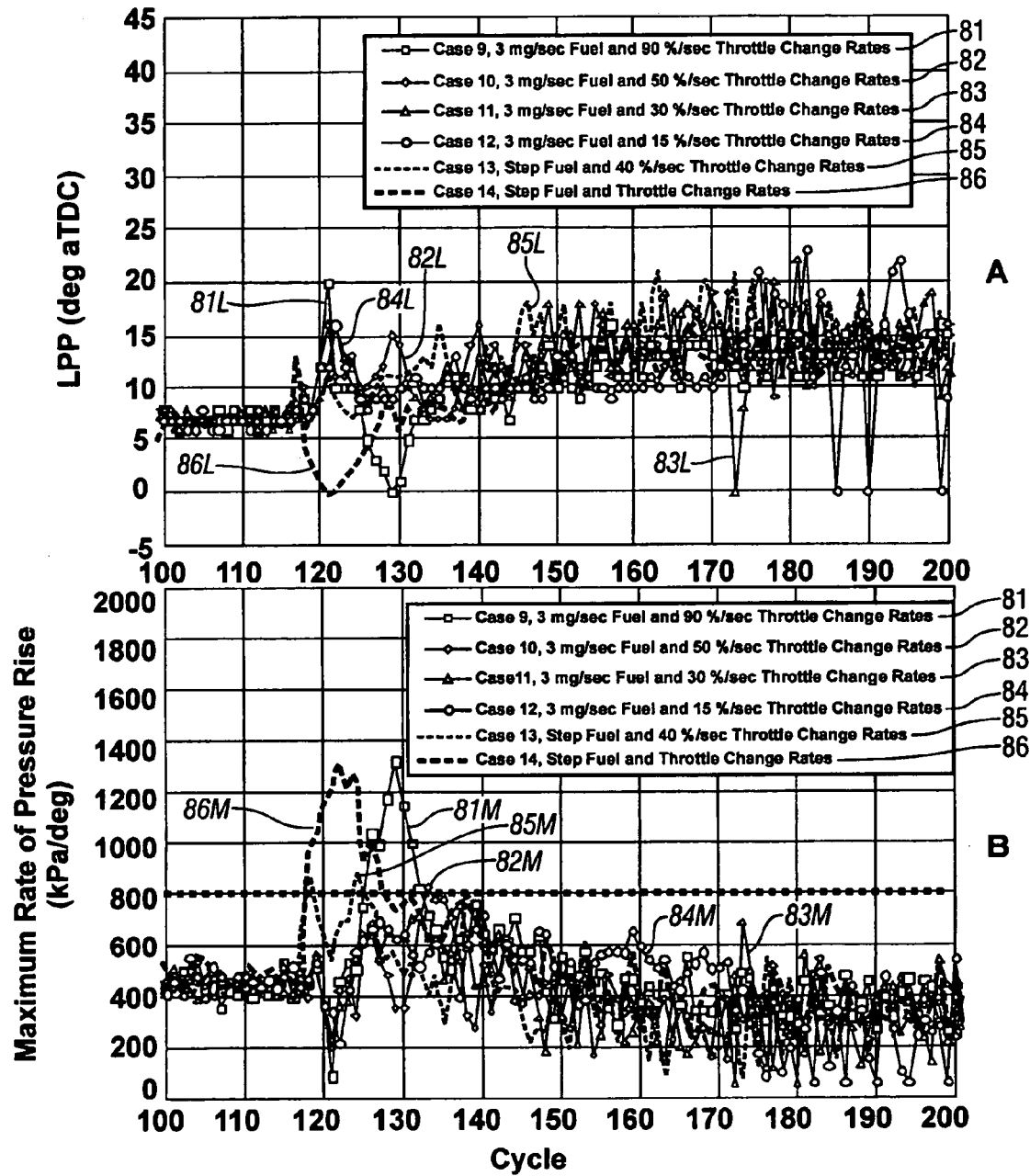
FIGS. 39A and B are graphs of measured LPP and maximum rate of pressure rise for cases 9-14.

As mentioned earlier, both NVO and EGR valve position are used during load transients as feedback control inputs. The feedback control is turned off for cases 7 and 8 to illustrate its effect on auto-ignition combustion. FIG. 25 shows the composite plot of test results for case 7 while FIG. 26 shows the composite plot of test results for case 8, both with the feedback control turned off.

FIGS. 27A and 27B show measured intake oxygen concentration (lines 71J, 76J, 77J, 78J) and exhaust air-fuel ratio (lines 71G, 76G, 77G, 78G), respectively, of cases 1, 6, 7, and 8 for load transition from 14 to 11 mg/cycle with and without feedback control. Again, the characteristic times of transition for intake oxygen concentration and exhaust air-fuel ratio remain the same with or without feedback control. However, slight differences in intake oxygen concentration (less than 1%) and exhaust air-fuel ratio (less than 0.3) are evident.

The NVO and EGR valve position changes required are shown in FIGS. 28A lines 71E, 76E, 77E, 78E, and 28B lines 71H, 76H, 77H, 78H. Although the differences in intake oxygen concentration and exhaust air-fuel ratio seem insignificant, the measured coefficient of variation (COV) of IMEP (as is evident by the cycle-to-cycle variation of IMEP shown in FIG. 29, (lines 71F, 76F, 77F, 78F) is clearly higher at 14 mg/cycle load operating condition. Further, both measured LPP and the maximum rate of pressure rise can deviate from the lookup table values as shown in FIGS. 30A (lines 71L, 76L, 77L, 78L) and 30B (lines 71M, 76M, 77M, 78M). Note that the engine can continue running under this quasi-steady state operation point if the feedback control is not turned on due to its sensitivity to engine thermal boundary conditions.

In summary, controlled auto-ignition combustion is quite robust during load transients from medium to high part load. There is no misfiring or partial-burn even with the feedback control turned off. However, it is observed that there is difficulty in repeating engine operation at medium load without the assistance of feedback control due to extreme sensitivity of controlled auto-ignition combustion to minor changes in engine thermal boundary conditions.

FIGS. 31-36 show test results of cases 9-14 (81-86) for load transition from 11 to 14 mg/cycle. The effect of throttle change rates are demonstrated using cases 9 to 12 while the effect of fuel change rates are examined using cases 9, 12, 13, and 14. Selected results are presented to illustrate the effectiveness of the present invention.

FIGS. 37A and 37B show measured intake oxygen concentration (lines 81J-86J) and exhaust air-fuel ratio (lines 81G-86G), respectively, of cases 9 to 14 for load transition from 11 to 14 mg/cycle. Contrary to cases 1-4, the intake oxygen concentration (J) is sensitive to the throttle change rates (I). In particular, the slower throttle change rate resulted in slower response of intake oxygen concentration and the characteristic time of transition becomes longer and more in line with that of the air-fuel ratio. When this happens, the measured IMEP values show smooth transition during load transients without any partial-burn as can be seen from FIG. 38 (lines 82F-85F) for cases 10-13. Both step (case 14, line 86F) and 90%/sec (case 9, line 81F) throttle change rates result in mismatch between intake oxygen concentration and air-fuel ratio, hence partial-burns occur. Further, both cases 9 and 14 show advanced LPP and audible knock during load transients as FIGS. 39A (lines 81L-86L) and 39B (lines 81M-86M) indicated.

Figure 40:
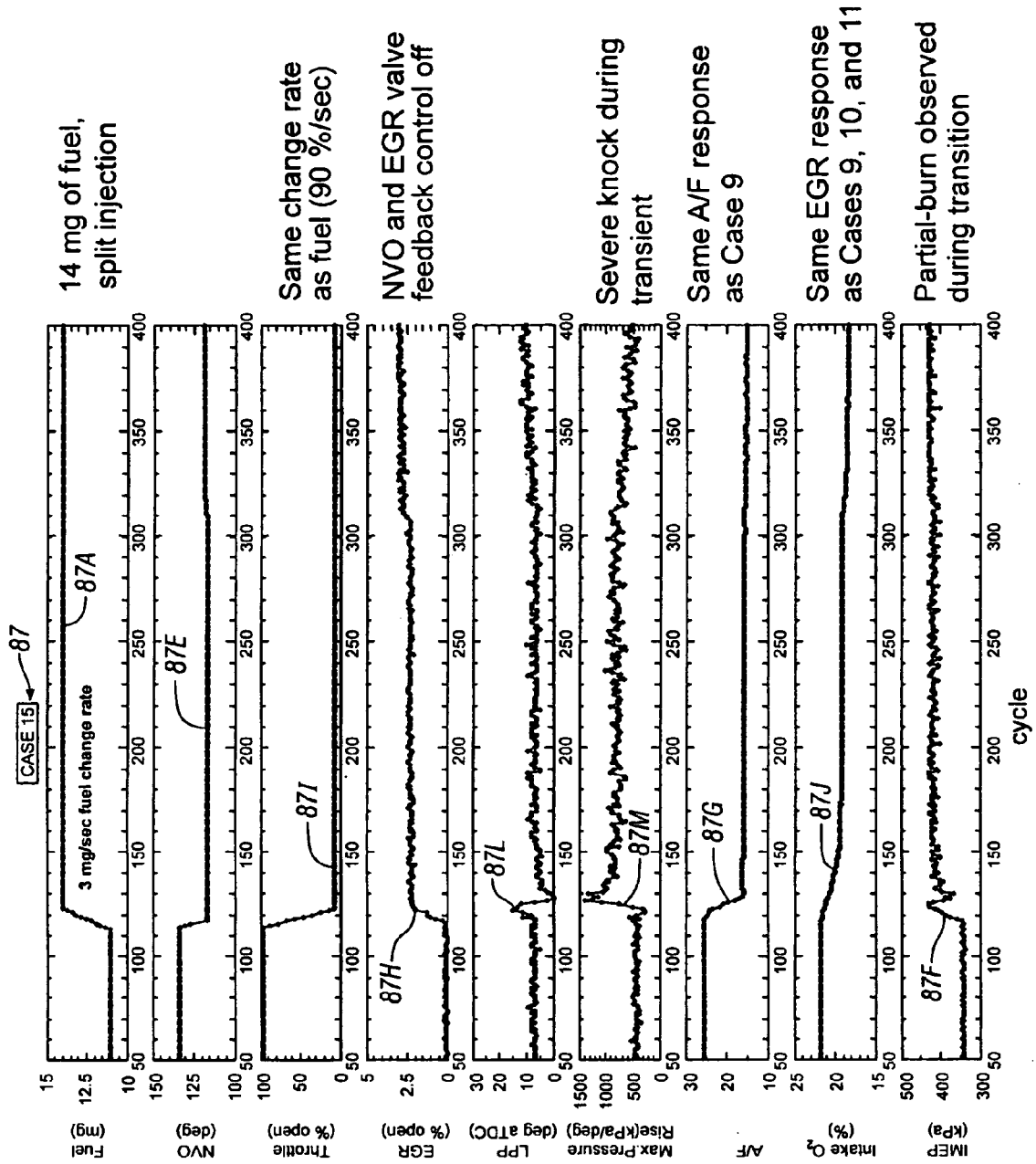
FIGS. 40 and 41 are composite graphs of the engine inputs for cases 15 and 16, respectively.
Figure 41:
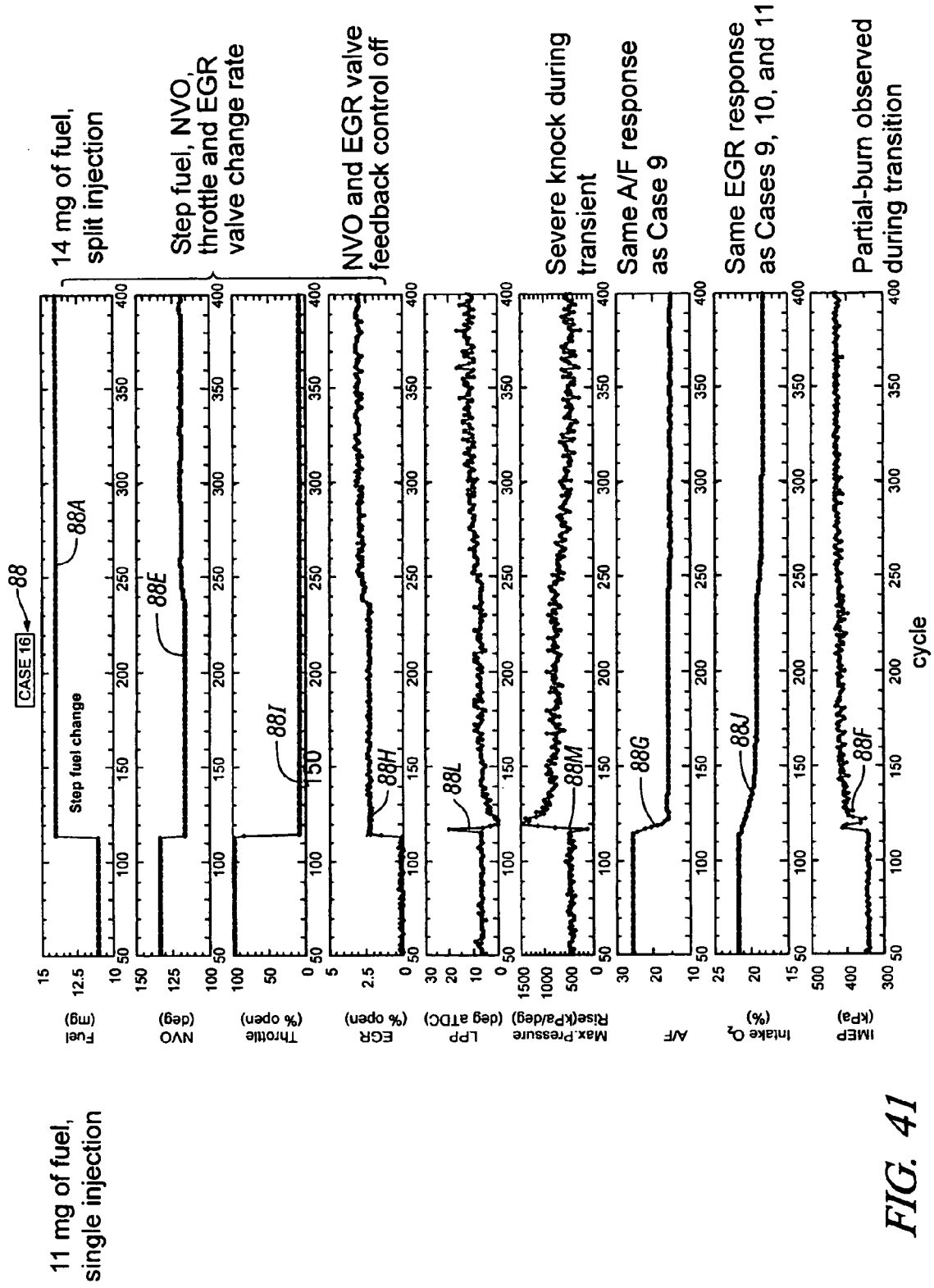
Figure 42:
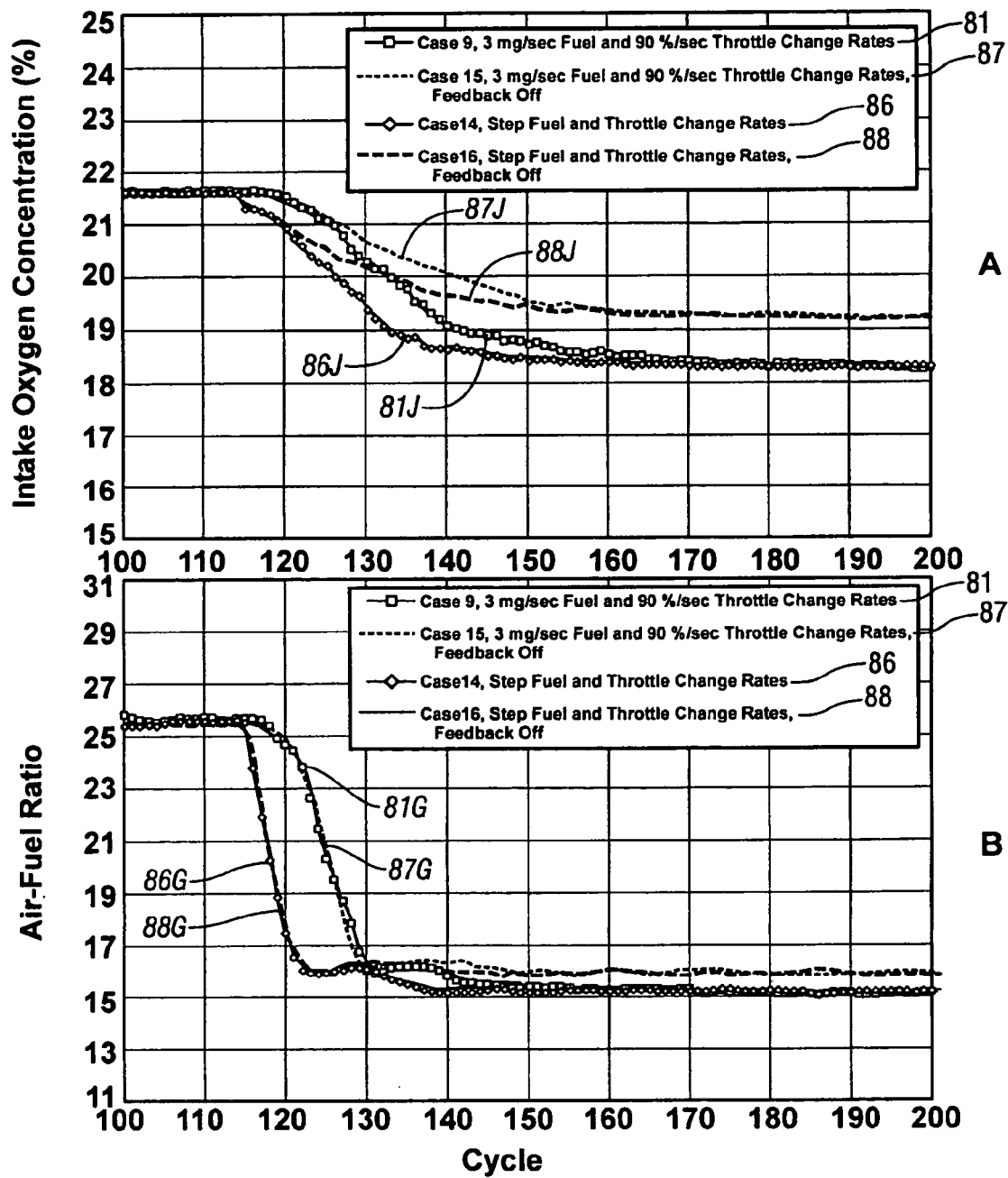
FIGS. 42A and B are graphs of measured percent intake 02 and exhaust air-fuel ratio for cases 9, 14, 15, and 16.
Figure 43:
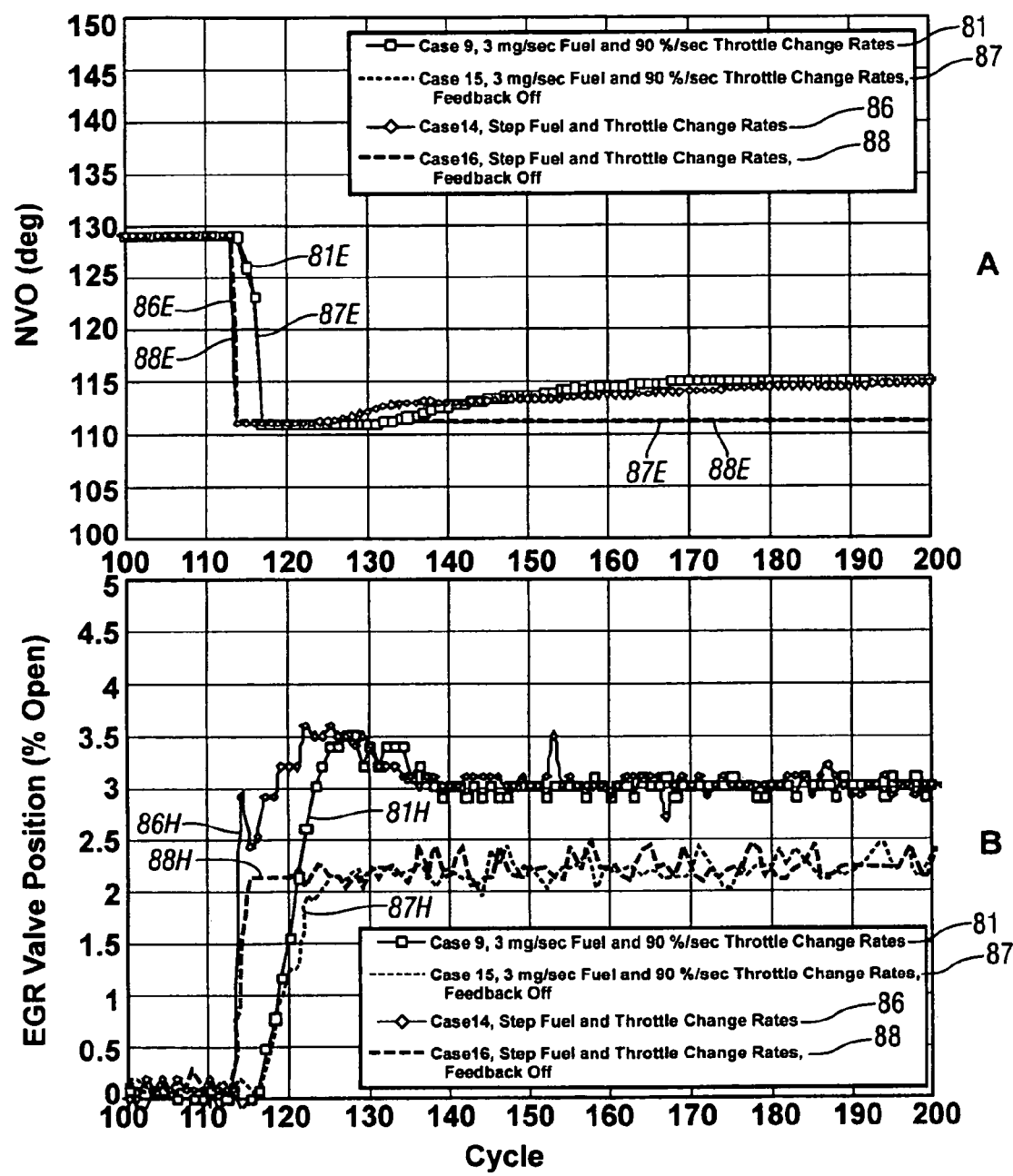
FIGS. 43A and B are graphs of actual NVO and EGR valve position, respectively for cases 9, 14, 15, and 16.

FIGS. 40 and 41 show test results of cases 15 (87) and 16 (88) where the feedback control was turned off for cases 9 and 14, respectively on NVO (E) and EGR (H) valve position.

FIGS. 42A and 42B show measured intake oxygen concentration (lines 81J, 86J, 87J, 88J) and exhaust air-fuel ratio (lines 81G, 86G, 87G, 88G) respectively, of cases 9, 14, 15, and 16 for load transition from 11 to 14 mg/cycle with and without feedback control turned on. In particular, the figures show that both intake oxygen concentration (J) and exhaust air-fuel ratio (G) can approach to a quasi-steady state value after transition that is somewhat different from the lookup table values given in FIG. 7 without the feedback control turned on.

Figure 44:
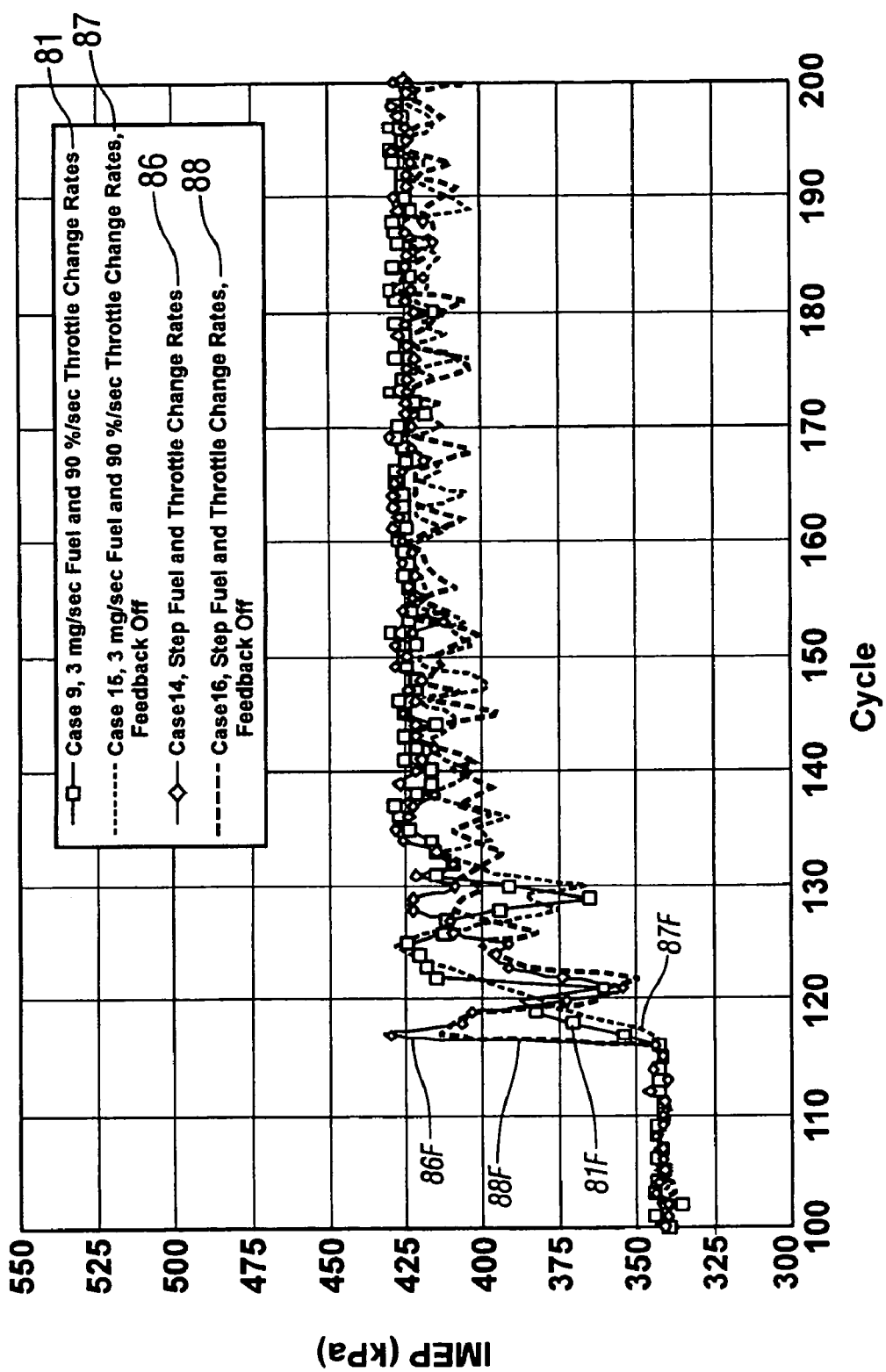
FIG. 44 is a composite graph of measured IMEP vs. engine cycles for cases 9, 14, 15, and 16.
Figure 45:
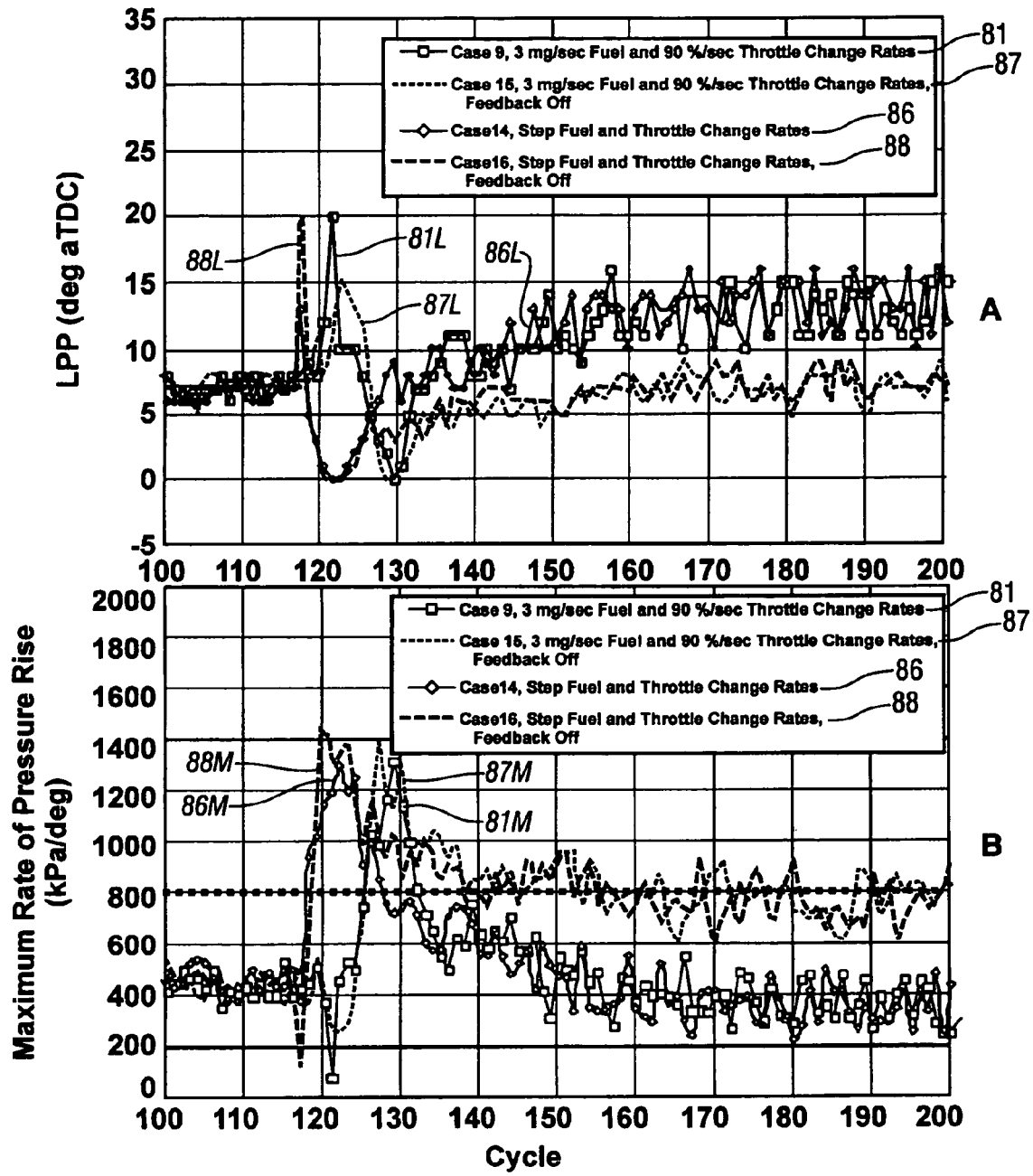
FIGS. 45A and B are graphs of measured LPP and maximum rate of pressure rise for cases 9, 14, 15, and 16.

Although only a small adjustment in both NVO (about 4 degrees, FIG. 43A) and EGR valve position (about 0.7%, FIG. 43B) to align both parameters to their respective lookup table values are required, the measured IMEP values after load transition show much improved COV level with the feedback control turned on (lines 81F, 86F) than without (lines 87F, 88F) as FIG. 44 indicated.

Although severe engine knock was evident with or without feedback control turned on as can be seen in FIG. 45B due to high throttle change rates used, both LPP and maximum rate of pressure rise are better regulated after the load transition with the feedback control turned on.

In summary, using a combination of feed forward control and lookup tables including fuel injection, variable valve actuation (NVO), spark timing (SI), throttle and EGR valve positions in conjunction with feedback control using NVO and EGR valve position, the controlled auto-ignition combustion is always stable between high part load and medium load without misfiring and partial burns with the present invention.

It should be understood that the broad concepts of the present invention are not limited to use with the exemplary feed forward/feedback control system referred to in the application. Nor is the invention limited to the use of controls based upon lookup tables as discussed herein. Further, for an engine operable in multiple modes of operation over its full operating range, some engine control inputs used in one mode of operation may be inactive in another mode.

As used herein, the term "synchronizing change rates" implies that the change rates of related control inputs are changed proportionally to the change in speed or load to which they are related. Thus, change rates of control inputs could be constant or varying relative to their related speed or load change. They could also be varying during one portion of a speed change, for example, and inactive, or fixed, in another portion where function of the input may be unneeded or performed by another input device. In such a case, the control input would have a fixed or variable change rate relationship with the speed change rate when the input is active but would have a zero rate relationship when the input is inactive.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for control of a direct-injection engine operated with controlled auto-ignition during load transient operations between modes of lean combustion low load (HCCI/

Lean) and stiochiometric combustion medium load (HCCI/Stoich.), the method comprising:

operating the engine at steady state, within a homogeneous charge compression-ignition (HCCI) load range, with fuel-air-exhaust gas mixtures at predetermined conditions, for each speed and load, of fueling mass flow rate (fueling rate), injection timing (FI), spark timing (SI), throttle position, exhaust gas recirculation (EGR) valve setting, and exhaust recompression obtained by negative valve overlap (NVO) between closing of the exhaust valves and opening of the intake valves in each cylinder; and controlling the engine during changes of operating mode between one to an other of HCCI/Stoich. medium load mode and HCCI/Lean lower load mode by synchronizing change rates of predetermined controlled inputs to the current engine fueling change rate, the predetermined controlled inputs including at least three of FI, SI, throttle position, EGR valve setting and NVO.

2. Method as in claim 1 and adjusting at least one of FI, SI, NVO, throttle and EGR valve position to control cylinder maximum rate of pressure rise, partial burns and misfires, the method including:

measuring engine intake oxygen percentage and exhaust air-fuel ratio; and adjusting at least one of FI, SI, NVO, throttle and EGR valve position so that measured intake oxygen percentage and exhaust air-fuel ratio closely follow predetermined values during transition between modes of lean combustion low load (HCCI/Lean) and stoichiometric combustion medium load (HCCI/Stoich.).

3. Method as in claim 1 wherein the engine inputs are synchronized by a feed forward control that maintains predetermined relationships between instantaneous fueling rate values and corresponding values of related engine inputs during load transient operations.

4. Method as in claim 3 wherein said predetermined relationships are provided by lookup tables accessible by a computer control system.

5. Method as in claim 3 wherein a feedback control adjusts the feed forward control based on measured values of engine performance to minimize errors in the controlled output values and more closely align the output values to the predetermined relationships.

6. Method as in claim 5 wherein said predetermined relationships are provided by lookup tables accessible by a computer control system.

* * * * *